(12) United States Patent
Tani et al.

(10) Patent No.: US 11,271,639 B2
(45) Date of Patent: Mar. 8, 2022

(54) COMMUNICATION SYSTEM, REPEATER, CONTROL STATION, AND CONTROL METHOD

(71) Applicant: Mitsubishi Electric Corporation, Tokyo (JP)

(72) Inventors: Shigenori Tani, Tokyo (JP); Akinori Fujimura, Tokyo (JP); Katsuyuki Motoyoshi, Tokyo (JP); Tsuyoshi Sasaki, Tokyo (JP); Futaba Ejima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 468 days.

(21) Appl. No.: 16/467,812

(22) PCT Filed: Dec. 13, 2016

(86) PCT No.: PCT/JP2016/087060
§ 371 (c)(1),
(2) Date: Jun. 7, 2019

(87) PCT Pub. No.: WO2018/109840
PCT Pub. Date: Jun. 21, 2018

(65) Prior Publication Data
US 2021/0359753 A1    Nov. 18, 2021

(51) Int. Cl.
*H04B 7/204*    (2006.01)
*H04B 7/155*    (2006.01)
(Continued)

(52) U.S. Cl.
CPC ............ *H04B 7/2041* (2013.01); *H04B 7/10* (2013.01); *H04B 7/155* (2013.01); *H04B 7/1851* (2013.01)

(58) Field of Classification Search
CPC ............ H04B 7/2041; H04B 7/18515; H04B 7/18513; H04B 7/18517; H04B 7/18508;
(Continued)

(56) References Cited

U.S. PATENT DOCUMENTS

| 6,442,148 | B1 | 8/2002 | Adams et al. |
| 2001/0034206 | A1* | 10/2001 | Thompson ......... H04B 7/18519 455/12.1 |
| 2014/0226555 | A1 | 8/2014 | Bell et al. |

FOREIGN PATENT DOCUMENTS

| CA | 2932700 A1 | 8/2015 |
| EP | 0854590 A2 | 7/1998 |

(Continued)

*Primary Examiner* — Keith Ferguson
(74) *Attorney, Agent, or Firm* — Birch, Stewart, Kolasch & Birch, LLP

(57) ABSTRACT

Provided is a communication system including a control station and a satellite repeater capable of forming two or more beams. The control station includes a control unit that classifies the two or more beams into clusters each made up of two or more beams among the two or more beams and allocates different frequencies to the beams belonging to one of the clusters. The satellite repeater includes a channelizer that performs exchanging processing on an input reception signal and outputs the reception signal having undergone the exchanging processing, as a transmission signal. A signal used in the exchanging processing includes a signal obtained by combining signals corresponding to the beams defining the one cluster.

11 Claims, 21 Drawing Sheets

(51) Int. Cl.
*H04B 7/10* (2017.01)
*H04B 7/185* (2006.01)

(58) Field of Classification Search
CPC .... H04B 7/15; H04B 7/15528; H04B 7/1555; H04B 7/10; H04B 7/1851; H04B 7/15507; H04B 7/185; H04B 3/36; H04B 7/155
See application file for complete search history.

(56) References Cited

FOREIGN PATENT DOCUMENTS

| EP | 3101821 A1 | 12/2016 |
| JP | 2010-288017 A | 12/2010 |
| JP | 4667364 B2 | 4/2011 |

\* cited by examiner

FIG.24

| BEAM NUMBER | CLUSTER NUMBER | REQUIRED BAND (STAR CONFIGURATION) | REQUIRED BAND (MESH CONFIGURATION) | TOTAL REQUIRED BAND (STAR CONFIGURATION) | TOTAL REQUIRED BAND (MESH CONFIGURATION) | ALLOCATION TYPE |
|---|---|---|---|---|---|---|
| 1 | 1 | 500MHz | 0MHz | 500MHz | 0MHz | B |
| 2 | 1 | 0MHz | 250MHz | | 250MHz | A |
| 3 | 2 | 100MHz | 250MHz | 500MHz | 250MHz | A+B |
| 4 | 2 | 400MHz | 0MHz | | | B |
| 5 | 3 | 50MHz | 0MHz | 100MHz | 0MHz | B |
| 6 | 3 | 50MHz | 0MHz | | | B |
| 7 | 4 | 0MHz | 125MHz | 0MHz | 250MHz | A |
| 8 | 4 | 0MHz | 125MHz | | | A |
| 9 | 5 | 125MHz | 0MHz | 125MHz | 250MHz | C |
| 10 | 5 | 0MHz | 250MHz | | | A |
| 11 | 6 | 125MHz | 125MHz | 125MHz | 250MHz | A+C |
| 12 | 6 | 0MHz | 125MHz | | | A |

COMMUNICATION SYSTEM, REPEATER, CONTROL STATION, AND CONTROL METHOD

FIELD

The present invention relates to a communication system including a repeater, a repeater, a control station, and a control method.

BACKGROUND

A satellite communication system has been introduced. This satellite communication system relays communication between two points on the earth, using artificial satellites. The phrase "on the earth" mentioned here includes situations such as on ships, and on aircrafts navigating the earth's atmosphere. In the satellite communication system, communication between two points on the earth is implemented in such a manner that a signal transmitted from a communication device on the earth is transmitted to another communication device on the earth by a repeater mounted on an artificial satellite, that is, the signal is relayed by the repeater. Hereinafter, the term "satellite" as simply mentioned indicates an artificial satellite.

In order to implement a larger transmission capacity in the satellite communication system, in recent years, a multibeam satellite that irradiates each region with a beam to transmit data is placed in operation. In order to cover a wide range using limited radio resources, the multibeam satellites uses the same frequency and the same polarized wave among regions where interference between beams does not matter. Such use of the same radio resource like the same frequency and the same polarized wave is called reuse of radio resources.

In order to enable a flexible response to a change in communication demand after the satellite launch, it is effective for a multibeam satellite to be equipped with a channelizer capable of changing the frequency allocated to each beam as described in Patent Literature 1. For example, when a disaster has happened in a specific region, a satellite communication system using the multibeam satellite equipped with the channelizer can increase the amount of frequency allocation to the specific region and therefore will be utilized as a substitute for a terrestrial communication network.

CITATION LIST

Patent Literature

Patent Literature 1: Japanese Patent No. 4667364

SUMMARY

Technical Problem

Since it is expected that a still larger transmission capacity in the satellite communication system will be required in the future, the number of beams in the multibeam satellite is likely to increase. For the multibeam satellite, unfortunately, the repeater, which is required to include analog devices such as an amplifier and a filter on a beam-by-beam basis, poses problems of the weight, power consumption, and cost of the satellite increasing as the number of beams increases. In particular, as the frequency used by satellite communication becomes higher, the antenna pattern formed with a certain antenna size has a narrower range and accordingly the beam size becomes smaller; as a result, the number of beams necessary for irradiating a certain region increases. Therefore, as the frequency used by the satellite communication becomes higher, the weight and power consumption of the satellite increase.

For a satellite equipped with a repeater including a channelizer to flexibly respond to a change in communication demand, the throughput of the channelizer needs to be enhanced for the purpose of increasing the size of frequency zone to be allocated to each beam when the number of beams increases. Furthermore, as described above, it is necessary to enhance the throughput of the channelizer also because of an increased number of beams. Therefore, when the channelizer is implemented by digital signal processing, the weight and power consumption of digital devices increase.

Meanwhile, satellites are required to reduce the weight and power consumption because of the restriction on the launch weight and the restriction on the power consumption arising from the operation of the satellite on orbit. For this reason, it is desirable to reduce the number of parts of the repeater's analog and digital devices.

The present invention has been made in view of the above circumstances and has as its object to obtain a communication system capable of responding to a change in communication demand while as well as of reducing the number of parts of analog and digital devices of a repeater.

Solution to Problem

In order to solve the above-mentioned problems and achieve the object, the present invention provides a communication system comprising a control station and a repeater capable of forming two or more beams, wherein the control station includes a control unit to classify the two or more beams into clusters each made up of two or more beams among the two or more beams and allocate different frequencies to the beams belonging to one of the clusters. The repeater includes an exchanging unit to perform exchanging processing on an input reception signal and output the reception signal having undergone the exchanging processing, as a transmission signal, and a signal used in the exchanging processing includes a signal obtained by combining signals corresponding to the beams defining the one cluster.

Advantageous Effects of Invention

The communication system according to the present invention has the effect of being capable of responding to the change in the communication demand as well as of reducing the number of parts of analog and digital devices of the repeater.

BRIEF DESCRIPTION OF DRAWINGS

FIG. 24 is a diagram illustrating an example of required bands and allocation types in the fourth embodiment.

DESCRIPTION OF EMBODIMENTS

Hereinafter, a communication system, a repeater, a control station, and a control method according to embodiments of the present invention will be described in detail with reference to the drawings. Note that this invention is not limited by these embodiments.

First Embodiment

Figure 1:
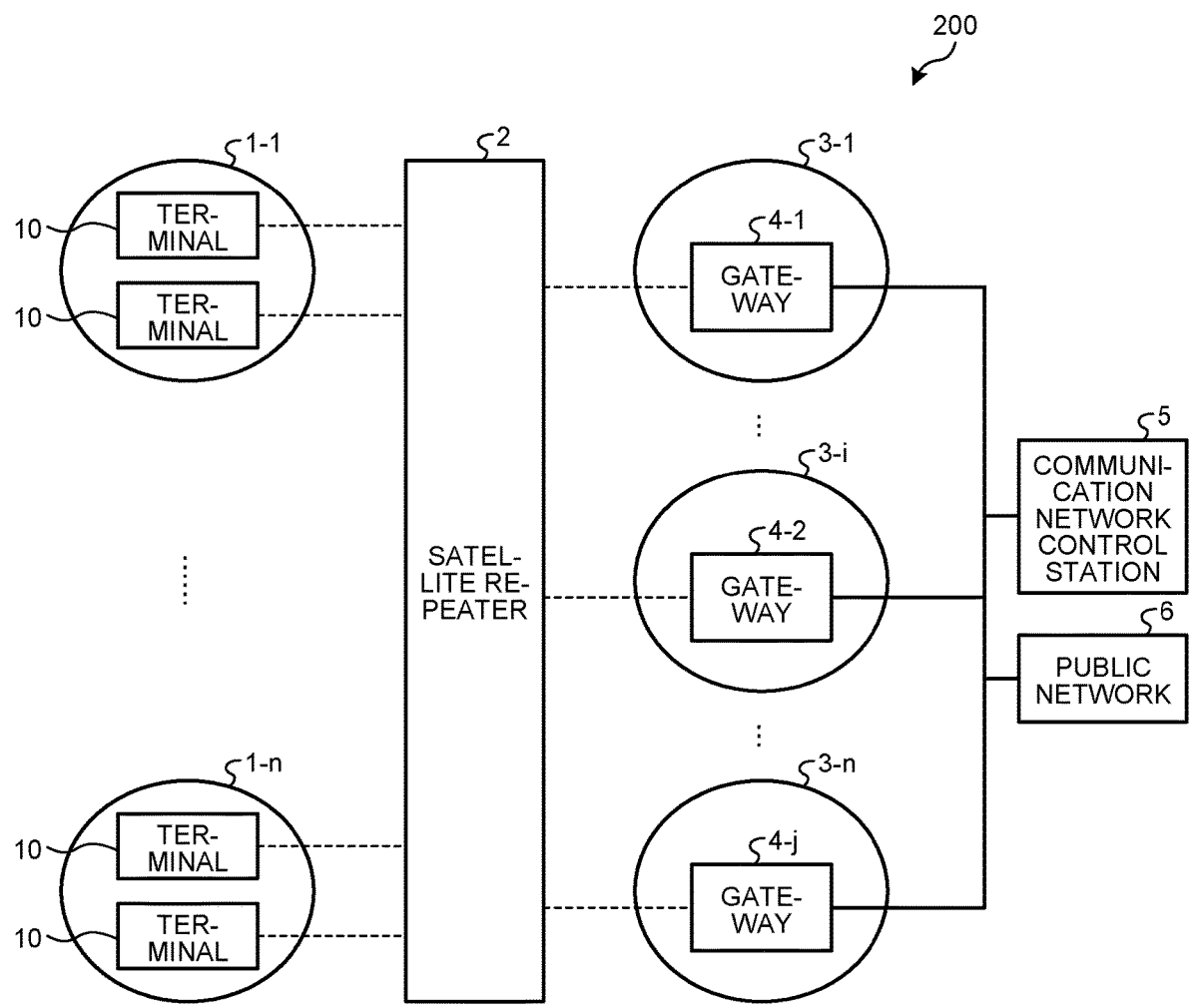
FIG. 1 is a diagram illustrating a configuration example of a satellite communication system according to a first embodiment.

FIG. 1 is a diagram illustrating a configuration example of a satellite communication system according to a first embodiment of the present invention. The satellite communication system 200 of the present embodiment includes a satellite repeater 2, gateways 4-1 to 4-$j$ ($j$ is an integer equal to or greater than two), and a communication network control station 5. In FIG. 1, dotted lines indicate that wireless connection is established and solid lines indicate that wired connection is established. FIG. 1 also illustrates terminals 10 that perform communication using the satellite communication system 200 of the present embodiment, and a public network 6, together with the satellite communication system 200 of the present embodiment.

The gateways 4-1 to 4-$j$ are connected to the communication network control station 5 and also connected to the public network 6. The public network 6 is used when the satellite communication system 200 provides the terminal 10 with communication with the Internet or the like, which is another communication system outside the satellite communication system 200 of the present embodiment. When the satellite communication system 200 of the present embodiment does not provide the terminal 10 with a service of communication with another communication system, the gateways 4-1 to 4-$j$ do not have to be connected to the public network 6. Hereinafter, the gateways 4-1 to 4-$j$ are referred to as gateways 4 when the gateways 4-1 to 4-$j$ are indicated without distinction.

The satellite repeater 2, which is a repeater mounted on a satellite, can form beams 1-1 to 1-$n$ ($n$ is an integer equal to or greater than two) and beams 3-1 to 3-$n$. The beams 1-1 to 1-$n$ are transmission/reception beams, and the beams 3-1 to 3-$n$ are transmission/reception beams. Hereinafter, the beams 1-1 to 1-$n$ are referred to as beams 1 when the beams 1-1 to 1-$n$ are indicated without distinction, and the beams 3-1 to 3-$n$ are referred to as beams 3 when the beams 3-1 to 3-$n$ are indicated without distinction.

In the example illustrated in FIG. 1, the gateway 4-1 is present within the irradiation range of the beam 3-1, the gateway 4-2 is present within the irradiation range of the beam 3-$i$ ($i$ is an integer satisfying 1<$i$<$n$), and the gateway 4-$j$ is present within the irradiation range of the beam 3-$n$. Hereinafter, the gateway 4 present in the irradiation range of the beam 3 formed by the satellite repeater 2 is referred to as the gateway 4 residing in the beam 3. In the example illustrated in FIG. 1, one gateway 4 is residing in one beam 3; however, the number of gateways residing in one beam 3 may be two or more. In addition, there may be a beam 3 in which the gateway 4 does not reside.

The terminal 10 is a terminal for which the satellite communication system 200 of the present embodiment provides a communication service. That is, the satellite communication system 200 relays communication of the terminal 10. In the example illustrated in FIG. 1, two terminals 10 are present within each of the irradiation range of the beam 1-1 and the irradiation range of the beam 1-$n$. Hereinafter, the terminal 10 present in the irradiation range of the beam 1 formed by the satellite repeater 2 is referred to as the terminal 10 residing in the beam 1. The number of terminals 10 residing in each beam 1 and the arrangement of the terminals 10 are not limited to the example illustrated in FIG. 1.

Note that, in FIG. 1, for the sake of clarity of explanation, the beams 1-1 to 1-n and the beams 3-1 to 3-n are denoted by different reference numerals; actually, however, beams 1-1 to 1-n and the beams 3-1 to 3-n may be identical beams. That is, the n beams actually formed by the satellite repeater 2 may be used as the beams 1-1 to 1-n and beams 3-1 to 3-n, as well.

The terminal 10 designates a destination to transmit a radio signal. Designating a destination means, for example, that a field of a destination address in a header of a frame transmitted as a radio signal retains the address of the communication apparatus that is the destination. The satellite repeater 2 receives the radio signal by the beam 1 in which the terminal 10 serving as the transmission source of this radio signal is residing. The satellite repeater 2 then transmits the received radio signal, using the beam 3 in which the gateway 4 corresponding to the destination. More specifically, the satellite repeater 2 transmits the received radio signal, using the beam 3 in which the gateway 4 corresponding to the communication apparatus designated as the destination is residing. The gateway 4 transmits the received radio signal toward the destination. Transmitting the signal toward a destination means to transmit the signal to a destination communication apparatus directly or indirectly, that is, via another communication apparatus or the like. In this manner, the satellite communication system 200 can relay communication between two points. Routing information, which is information indicating the correspondence between the gateway 4 and the destination of the radio signal, is transmitted from the gateway 4 to the satellite repeater 2 as described later (not illustrated).

Hereinafter, the communication line between the terminal 10 and the satellite repeater 2 is called a user link, and the communication line between the satellite repeater 2 and each of the gateways 4-1 to 4-j is called a feeder link.

Next, the configurations of the terminal 10, the satellite repeater 2, the gateway 4, and the communication network control station 5 of the present embodiment will be described. Note that, in the present embodiment, the terminal 10 and the gateway 4 to be used may be of any configuration and those which are commonly used; accordingly, the detailed description of the configurations of these members will be omitted.

Figure 2:
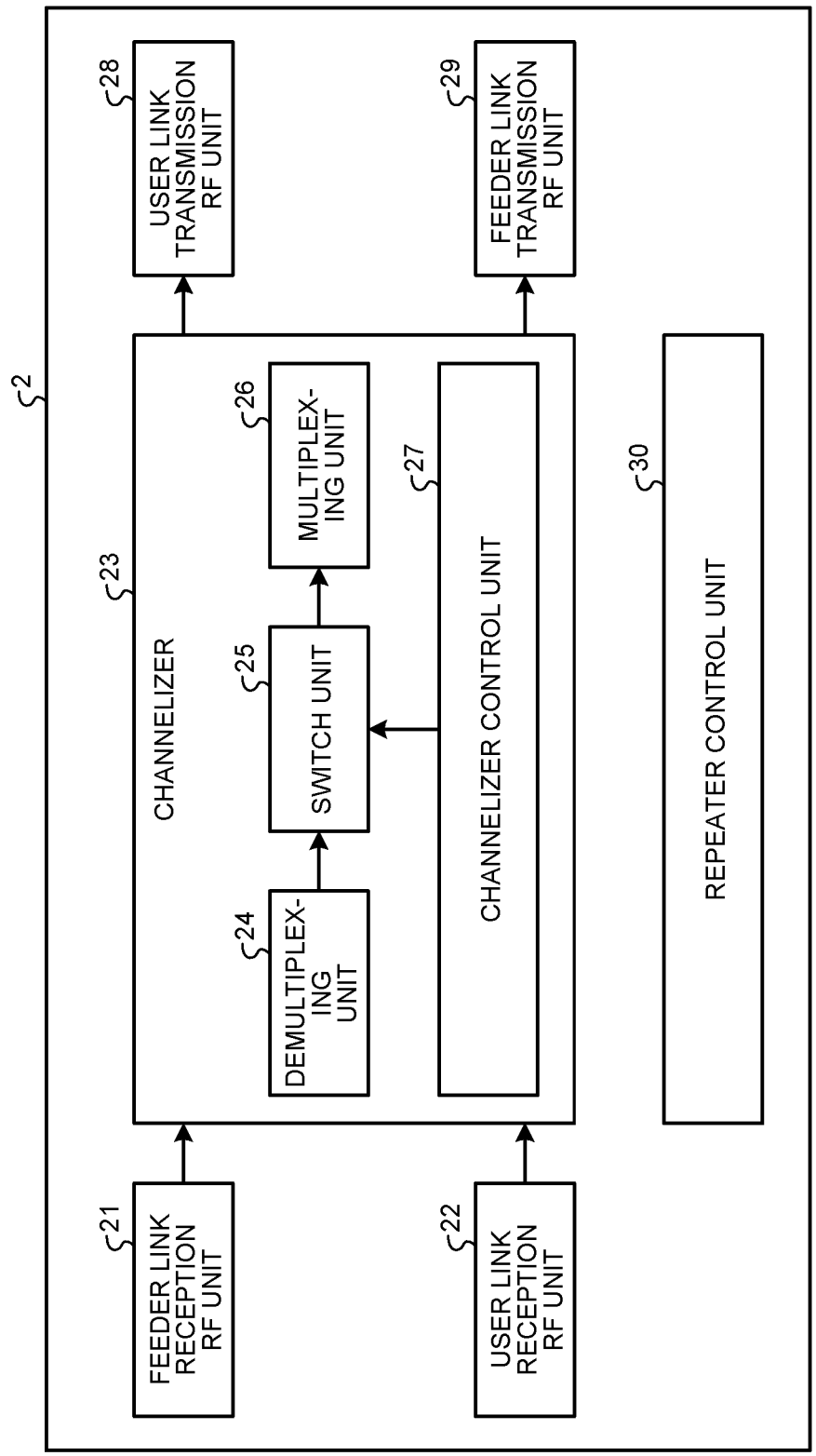
FIG. 2 is a diagram illustrating a configuration example of a satellite repeater according to the first embodiment.

FIG. 2 is a diagram illustrating a configuration example of the satellite repeater 2 according to the first embodiment. The satellite repeater 2 of the present embodiment includes a feeder link reception radio frequency (RF) unit 21, a user link reception RF unit 22, a channelizer 23, a user link transmission RF unit 28, a feeder link transmission RF unit 29, and a repeater control unit 30. The channelizer 23 is an exchanging unit that performs exchanging processing on an input reception signal and outputs the reception signal having undergone the exchanging processing, as a transmission signal. The channelizer 23 includes a demultiplexing unit 24, a switch unit 25, a multiplexing unit 26, and a channelizer control unit 27.

Although FIG. 2 illustrates one feeder link reception RF unit 21, one user link reception RF unit 22, one user link transmission RF unit, and one feeder link transmission RF unit are illustrated in FIG. 2, the number of the feeder link reception RF units 21, the user link reception RF units 22, the user link transmission RF units, and the feeder link transmission RF units is each determined according to the number of beams. In the present embodiment, processing is carried out on a cluster-by-cluster basis, the cluster being made up of two beams, as will be described later. The number of the user link reception RF units 22 and the number of the user link transmission RF units each are a value obtained by dividing n by two where n is an even number. The number of the units 22 and the number of the units 28 are each a value obtained by dividing n by two and adding one to a the resultant quotient where n is an odd number. The number of the feeder link reception RF units 21 and the number of the feeder link transmission RF units are the same as the number of the gateways. Note that, in consideration of spares, the satellite repeater 2 may include a greater number than the above-described number of the feeder link reception RF units 21, the user link reception RF units 22, the user link transmission RF units, and the feeder link transmission RF units.

Figure 3:
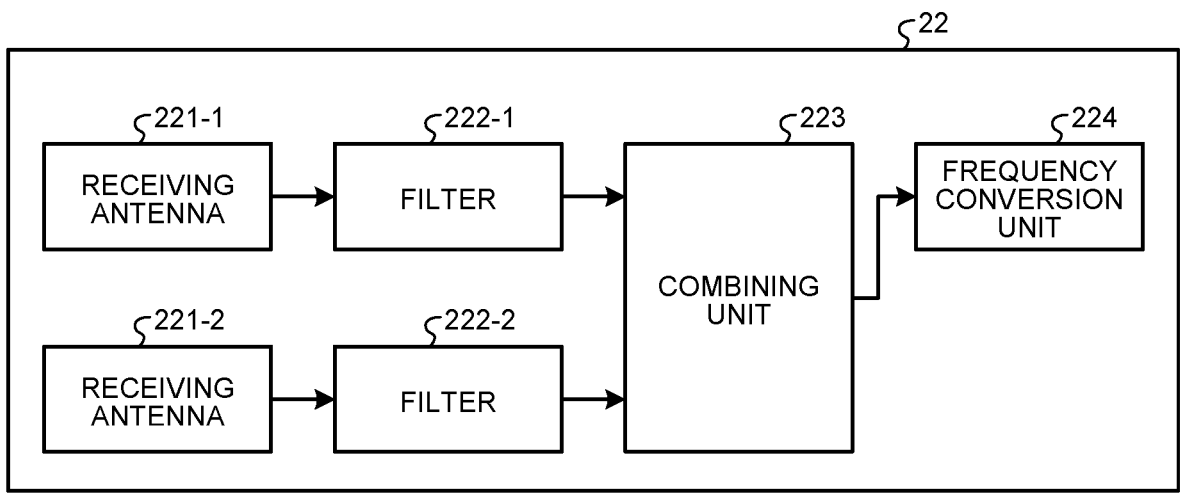
FIG. 3 is a diagram illustrating a configuration example of a user link reception radio frequency (RF) unit according to the first embodiment.

FIG. 3 is a diagram illustrating a configuration example of the user link reception RF unit 22 according to the first embodiment. The user link reception RF unit 22, which is a reception processing unit, includes receiving antennas 221-1 and 221-2, filters 222-1 and 222-2, a combining unit 223, and a frequency conversion unit 224, which is a reception frequency conversion unit. The receiving antennas 221-1 and 221-2 serve as an antenna unit capable of forming two beams.

Figure 4:
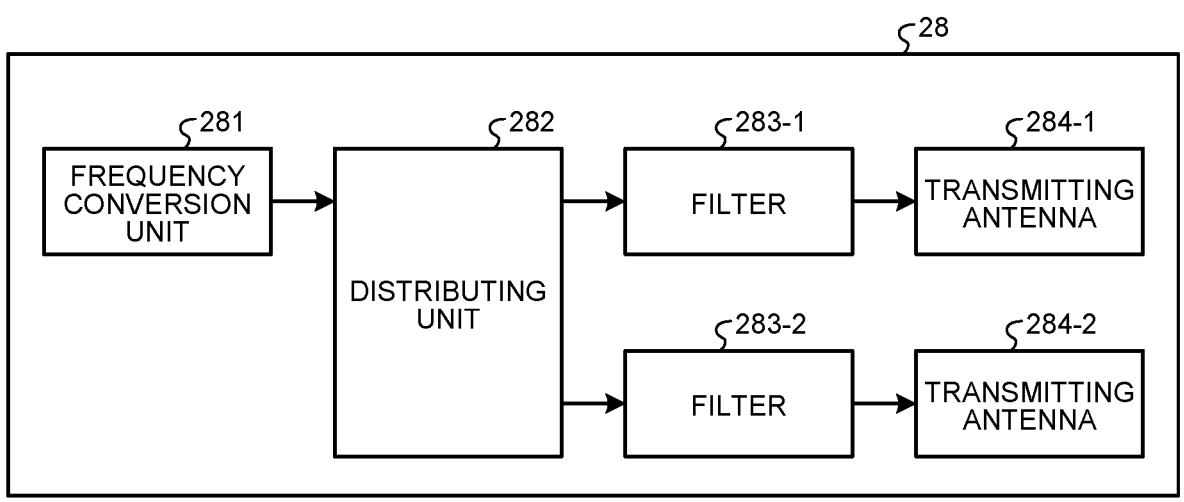
FIG. 4 is a diagram illustrating a configuration example of a user link transmission RF unit according to the first embodiment.

FIG. 4 is a diagram illustrating a configuration example of the user link transmission RF unit 28 according to the first embodiment. The user link transmission RF unit 28, which is a transmission processing unit, includes a frequency conversion unit 281, a distributing unit 282, filters 283-1 and 283-2, and transmitting antennas 284-1 and 284-2.

Figure 5:
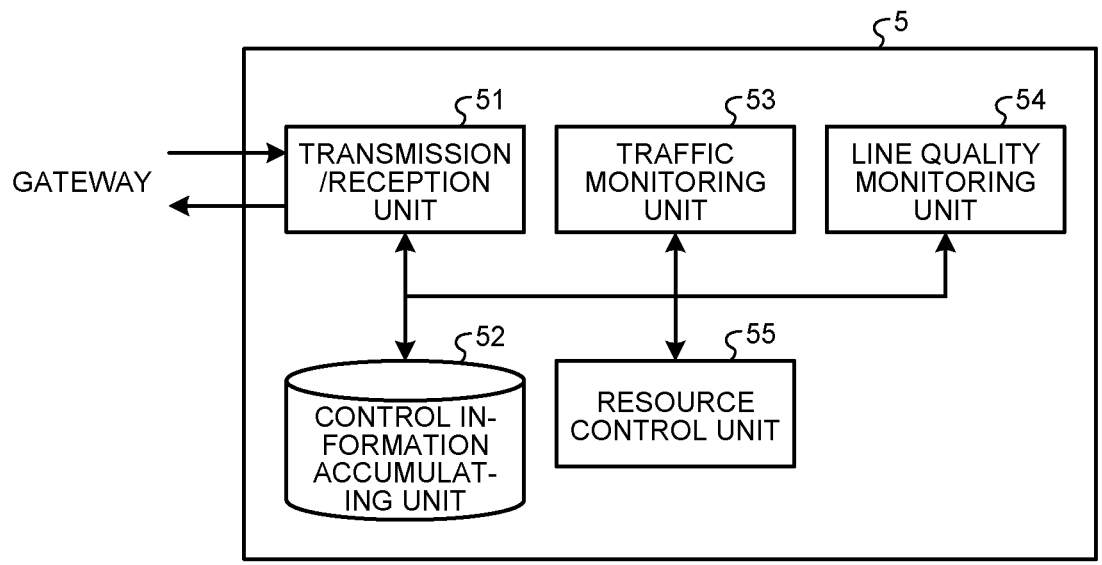
FIG. 5 is a diagram illustrating a configuration example of a communication network control station according to the first embodiment.

FIG. 5 is a diagram illustrating a configuration example of the communication network control station 5 according to the first embodiment. The communication network control station 5, which is a control station, includes a transmission/reception unit 51, a control information accumulating unit 52, a traffic monitoring unit 53, a line quality monitoring unit 54, and a resource control unit 55. As will be described later, the resource control unit 55, which is a control unit, classifies the beams 1-1 to 1-n illustrated in FIG. 1 as an example of two or more beams into clusters each made up of two beams among the beams 1-1 to 1-n, and allocates different frequencies to beams belonging to one cluster.

Each unit illustrated in FIG. 2 to FIG. 5 can be implemented as hardware such as an independent apparatus or processing circuit. For example, each of the transmitting antennas and the receiving antennas is an antenna and each of other units is a processing circuit such as an analog circuit or a digital circuit. In addition, each unit may be configured as an independent processing circuit or apparatus, alternatively, a plurality of functional units may be configured as one processing circuit or apparatus.

For example, the above-mentioned processing circuit may be dedicated hardware or a control circuit including a processor. In a case where the processing circuit is implemented by dedicated hardware, each processing circuit is, for example, a single circuit, a composite circuit, a programmed processor, a parallel programmed processor, an application specific integrated circuit (ASIC), a field programmable gate array (FPGA), or a combination thereof.

Figure 6:
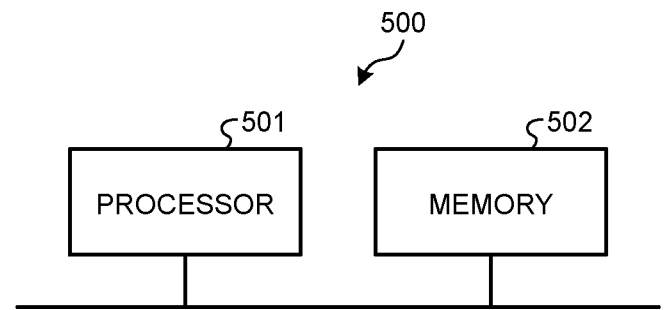
FIG. 6 is a diagram illustrating a configuration example of a control circuit according to the first embodiment.

When the processing circuit is a control circuit including a processor, this control circuit is, for example, a control circuit illustrated in FIG. 6. FIG. 6 is a diagram illustrating a configuration example of the control circuit 500 according to the first embodiment. The control circuit 500 includes a processor 501 and a memory 502. The processor 501 is a central processing unit (also referred to as CPU, processing unit, arithmetic unit, microprocessor, microcomputer, processor, or digital signal processor (DSP)). The memory 502 is regarded, for example, as a nonvolatile or volatile semiconductor memory such as a random access memory (RAM), a read only memory (ROM), a flash memory, an erasable programmable read only memory (EPROM), or an electrically erasable programmable read only memory (EEPROM), a magnetic disk, a flexible disk, an optical disc, a compact disk, a mini disk, and a digital versatile disk (DVD). In a case where there is a unit implemented by the control circuit 500 among the respective units illustrated in FIG. 2 to FIG. 5, this unit is implemented by the processor 501 executing a program retained in the memory 502. The memory 502 is also used as a storage area when the program is executed by the processor 501.

Next, the operation of the present embodiment will be described. First, the operation of the satellite repeater 2 will be described with reference to FIG. 2. The user link reception RF unit 22 receives radio signals from the terminals 10 with the beams 1-1 to 1-*n* and outputs a signal to the channelizer 23. In the channelizer 23, the demultiplexing unit 24 demultiplexes the signal received from the user link reception RF unit 22, into a plurality of demultiplexed signals and outputs the demultiplexed signals to the switch unit 25. Note that, although not illustrated, the demultiplexing unit 24 includes one or more input ports and a plurality of output ports. The channelizer control unit 27 informs the demultiplexing unit 24 of demultiplexing information indicating the demultiplexing method carried out by the demultiplexing unit 24. For example, the demultiplexing information may be transmitted from the gateway 4 to the satellite repeater 2 or may be predetermined. The switch unit 25 includes a plurality of input ports and one or more output ports and holds the routing information received from the gateway 4 as a routing table. The switch unit 25 outputs the signals received from the demultiplexing unit 24, to corresponding ports of the multiplexing unit 26 in accordance with the routing table. Although not illustrated, the multiplexing unit 26 includes a plurality of input ports and an output port and multiplexes the signals output from the switch unit 25 to output the multiplexed signal to the feeder link transmission RF unit 29. The channelizer control unit 27 informs the multiplexing unit 26 of multiplexing information indicating the multiplexing method carried out by the multiplexing unit 26. For example, the multiplexing information may be transmitted from the gateway 4 to the satellite repeater 2 or may be predetermined. The demultiplexing information, the routing information, and the multiplexing information are determined for each of relaying in the direction from the user link to the feeder link and relaying in the direction from the feeder link to the user link.

Although not illustrated, the repeater control unit 30 is connected to each unit provided in the satellite repeater 2 and controls the operation of each unit. The feeder link reception RF unit 21 receives radio signals from the gateways 4 by the beams 3-1 to 3-*n* and outputs a signal to the channelizer 23. In the channelizer 23, the demultiplexing unit 24 demultiplexes the signal received from the feeder link reception RF unit 21, into a plurality of demultiplexed signals and outputs the demultiplexed signals to the switch unit 25. The switch unit 25 outputs the signals received from the demultiplexing unit 24 to corresponding ports of the multiplexing unit 26 in accordance with the routing table. The multiplexing unit 26 multiplexes the signals output from the switch unit 25 and outputs the multiplexed signal to the feeder link transmission RF unit 29.

Figure 7:
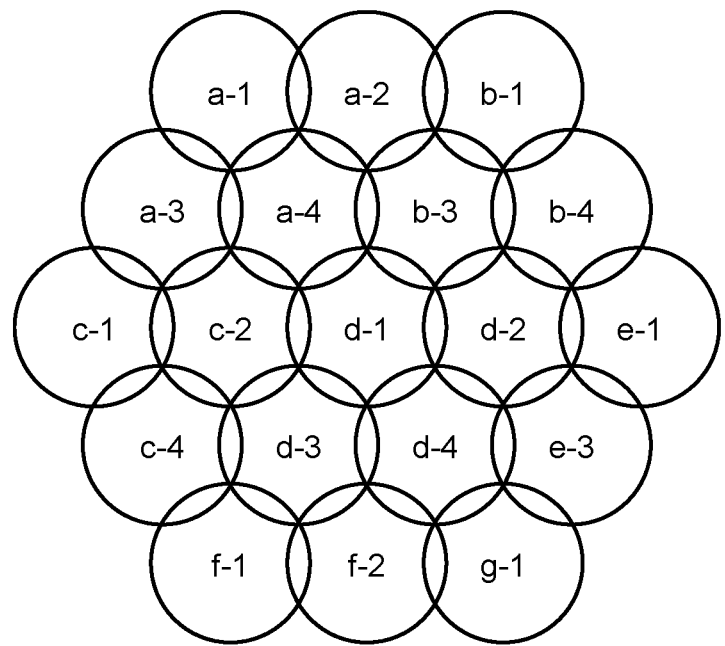
FIG. 7 is a diagram illustrating an arrangement example of beams of a user link according to the first embodiment.
Figure 8:
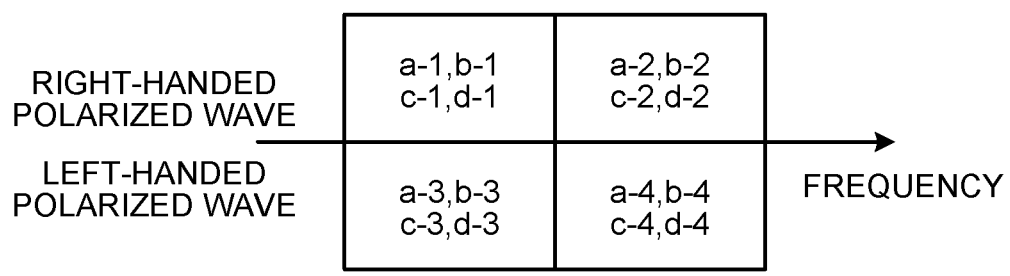
FIG. 8 is a diagram illustrating an example of frequencies and polarized waves used in the respective beams in FIG. 7.

Next, the operation of the user link reception RF unit 22 illustrated in FIG. 3 will be described. FIG. 7 is a diagram illustrating an arrangement example of the beams 1 of the user link. FIG. 7 illustrates footprints that are areas on the ground irradiated with the respective beams 1. FIG. 8 is a diagram illustrating an example of frequencies and polarized waves used in the respective beams in FIG. 7.

FIG. 7 illustrates the beams 1 that total 19 and these beams are numbered a-1 to a-4, b-1, b-3, b-4, c-1, c-2, c-4, d-1 to d-4, e-1, e-3, f-1, f-2, and g-1. In the example illustrated in FIG. 7, four adjacent beams are gathered into one group and the same alphabet is used for the numbers given to beams belonging to the same group. Then, beams belonging to the same group, that is, beams whose numbers use the same alphabet use different radio resources. That is, the beams using the same alphabet differ in at least one of the frequency and the polarized wave. In addition, the beams having beam numbers with the same branch number are arranged at the same position in each group.

Furthermore, in FIG. 7, the beams having the beam numbers with the same branch number use the same frequency and polarized wave. For example, the beams numbered a-1, b-1, c-1, d-1, e-1, f-1, and g-1 use the same frequency and polarized wave.

Since the beams in the same group are adjacent to each other, use of the same frequency and polarized wave for such adjacent beams causes interference therebetween. In contrast, for example, the beams b-1, c-1, and d-1, which have the same branch number but belong to the different groups, are not geographically adjacent to each other and thus the interference is sufficiently small, such that these beams can utilize the same polarized wave and frequency. Note that the types of polarized waves include linearly polarized waves and circularly polarized waves, and the circularly polarized waves include right-handed polarized waves and left-handed polarized waves. FIG. 8 illustrates an example in which the right-handed polarized waves and the left-handed polarized waves of the circularly polarized waves are used. Although FIG. 8 illustrates the frequencies and polarized waves corresponding to the beam numbers of the groups corresponding to the alphabets from a to d, the same goes for the groups corresponding to the alphabets from e to g. That is, the beams having the beam numbers with the same branch number in the groups corresponding to the alphabets e to g use the same polarized wave and frequency. In FIG. 7, a beam with the beam number b-2 is not illustrated; however, when the number of beams is increased, the number of beams can be increased in such a manner that, for example, the beam with the number b-2 is arranged on the right side of the beam with the number b-1.

In the example illustrated in FIG. 8, a user link band, which is the entire frequency band usable in the user link, is divided into the number of beams defining the cluster. That is, in this example, since the cluster is made up of two beams, the user link band is divided into two. Then, among the two frequency bands, a frequency band having a lower frequency is allocated to the beams having the beam numbers with the branch numbers 1 and 3, whereas a frequency band having a higher frequency is allocated to the beams having the beam numbers with the branch numbers 2 and 4.

Although the following description is based on, by way of example, the assumption that the beams are arranged and use the frequencies and polarized waves as illustrated in FIGS. 7 and 8, the arrangement of the beams and the frequencies and polarized waves used for the respective beams are not limited to the examples illustrated in FIGS. 7 and 8.

Figure 9:
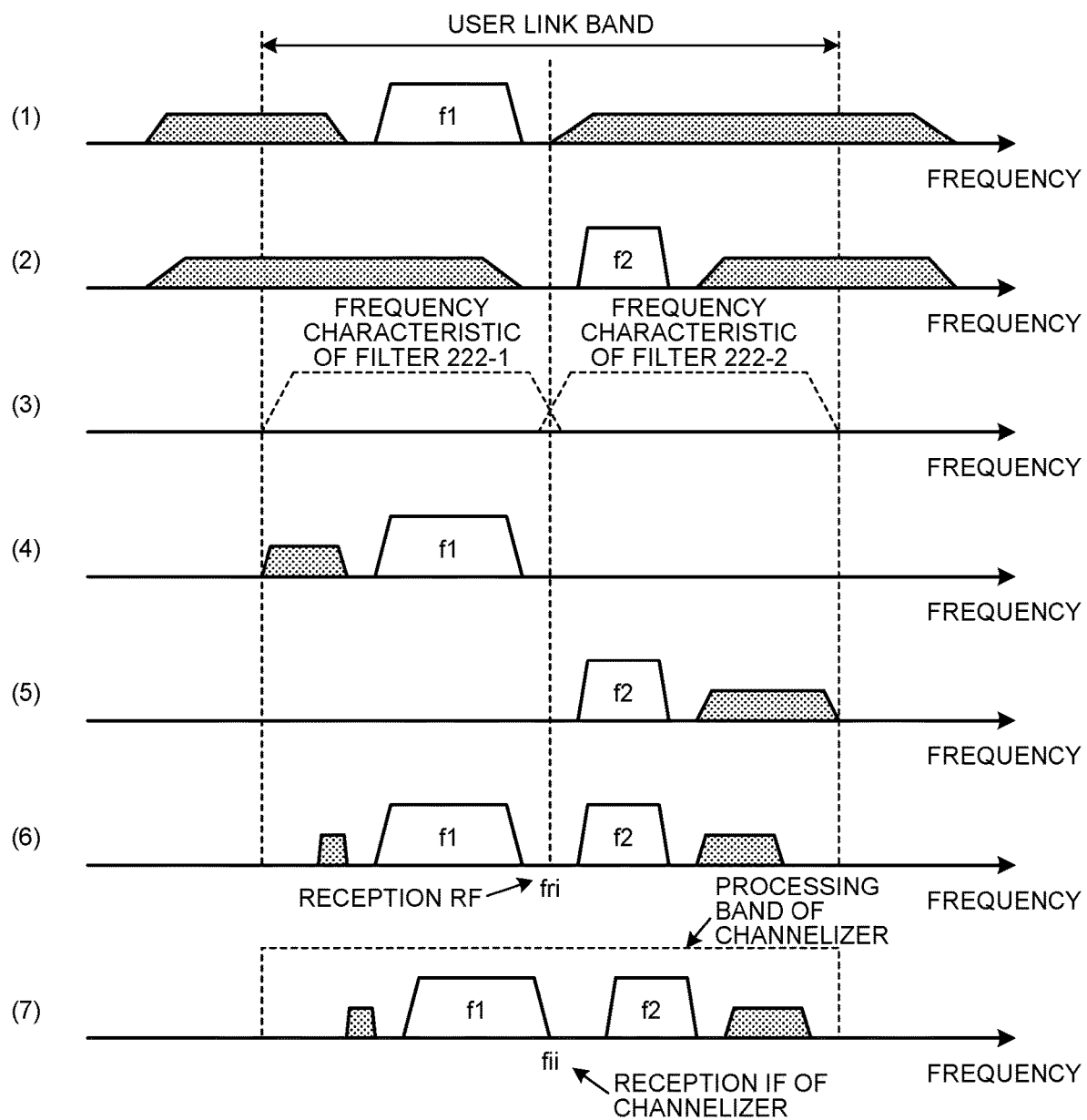
FIG. 9 is a diagram illustrating an operation example of the user link reception RF unit when a satellite repeater relays a signal transmitted from a terminal to a gateway.

FIG. 9 is a diagram illustrating an operation example of the user link reception RF unit 22 when the satellite repeater 2 relays a signal transmitted from the terminal 10 to the gateway 4. In the present embodiment, the beams 1-1 to 1-*n* are classified into clusters such that one cluster is made up of two beams. For example, the beams are classified such that the beams 1-1 and 1-2 define one cluster and the beams 1-3 and 1-4 define another cluster. The user link reception RF unit 22 processes signals received by two beams of the same cluster. Note that, although an example in which one cluster is made up of two beams will be described herein, one cluster may be made up of three or more beams.

In the example illustrated in FIG. 9, the beams 1-1 and 1-2 belong to the same cluster. In the example illustrated in FIG. 9, the user link band is divided into two, which is the number of beams defining the cluster, as illustrated in FIG. 8. Then, assume that a lower frequency zone f1 is allocated to the beam 1-1 and a higher frequency zone f2 is allocated to the beam 1-2. Note that the satellite repeater 2 notifies each terminal 10 of the allocated frequency, that is, frequency zone and polarized wave to perform transmission and reception. Since the operation of notifying the allocated frequency and polarized wave is similar to the common operation, the explanation will be omitted.

In the user link reception RF unit 22 of the satellite repeater 2, as illustrated in (1) of FIG. 9, the receiving antenna 221-1 receives, with the beam 1-1, signals including the signal in the frequency zone f1, which is a desired signal transmitted from the terminal 10. The receiving antenna 221-1 then passes the received signal to the filter 222-1. In FIG. 9, the desired signal is illustrated without hatching, while the reception signal other than the desired signal is illustrated with hatching. Note that, in FIG. 9, a signal denoted as f1 without hatching is a signal transmitted from the terminal 10 residing in the beam 1-1. This signal is a signal transmitted using a part of the frequency zone f1. Similarly, a signal denoted as f2 without hatching in FIG. 9 indicates a signal transmitted from the terminal 10 residing in the beam 1-2. This signal is a signal transmitted using a part of the frequency zone f2.

In the satellite repeater 2, as illustrated in (2) of FIG. 9, the receiving antenna 221-2 receives, with the beam 1-2, a signal including the signal in the frequency zone f2, which is a desired signal transmitted from the terminal 10. The receiving antenna 221-2 then passes the received signal to the filter 222-2.

In FIG. 9, (3) illustrates an example of the frequency characteristic of each of the filters 222-1 and 222-2. The filter 222-1 has a frequency characteristic for extracting a signal in the frequency zone f1 and removing a signal of another frequency. The filter 222-2 has a frequency characteristic for extracting a signal in the frequency zone f2 and removing a signal of another frequency. These frequency characteristics of the filters 222-1 and 222-2 perform filtering on the signals received from the receiving antennas 221-1 and 221-2, respectively, and then output the filtered signals to the combining unit 223. In FIG. 9, (4) illustrates the filtered signal provided by the filter 222-1, while (5) of FIG. 9 illustrates the filtered signal provided by the filter 222-2. As discussed above, the filters 222-1 and 222-2, which define a receiving filter unit, have the different frequency characteristics for performing filtering on the signals received with two beams belonging to the same cluster.

The combining unit 223 combines the signals associated with the two beams, that is, the signal received from the filter 222-1 and the signal received from the filter 222-2, and passes the combined signal to the frequency conversion unit 224. That is, the combining unit 223 combines the signals processed by the receiving filter unit, to thereby generate one combined signal. In FIG. 9, (6) illustrates the combined signal provided by the combining unit 223. There is a possibility that the signals received with each beam 1 contain unnecessary waves. However, these unnecessary waves in a range other than the ranges corresponding to the frequency characteristics of the filters 222-1 and 222-2 are removed with filtering performed by the filters 222-1 and 222-2. Accordingly, in the combined signal, for example, the frequency zone corresponding to the frequency characteristic of the filter 222-1 contains no signal received with the other beam of the same cluster.

As illustrated in (7) of FIG. 9, the frequency conversion unit 224 converts the frequency of the combined signal provided by the combining unit 223 and passes the frequency-concerted signal to the channelizer 23. More specifically, the frequency conversion unit 224 converts the frequency as follows. The center frequency of the user link band is defined as a reception RF fri. As described above, the user link band is the entire frequency band usable in the user link. In the present embodiment, as described above, the user link band is divided into two, which is the number of beams defining the cluster. In addition, the center frequency of a processing band of the channelizer on the input side is defined as a reception intermediate frequency (IF) fii. The frequency conversion unit 224 performs frequency conversion that shifts the frequency of the entire combined signal provided by the combining unit 223 such that the center frequency of the frequency zone after the frequency conversion matches the frequency fii in the user link band. The processing band of the channelizer on the input side is a frequency band in which the signal can be an input signal received by the demultiplexing unit 24 of the channelizer 23. As described above, the frequency conversion unit 224, which is the reception frequency conversion unit, converts the frequency of the combined signal and outputs the frequency-converted combined signal to the channelizer 23.

The channelizer 23 demultiplexes the signal received from the frequency conversion unit 224, multiplexes the post-demultiplexing signals in accordance with the routing table, and passes the multiplexed signal to the feeder link transmission RF unit 29. The feeder link transmission RF unit 29 transmits the signal received from the channelizer 23, with the beam 3.

Through above-described operation, the user link reception RF unit 22 of the present embodiment can collect the signals received with the two beams 1, into one signal and input the collected one signal to the channelizer 23. That is, the signal used in the exchanging processing performed by the channelizer 23 includes a signal obtained by combining signals corresponding to the beams defining one cluster. In addition, multiplexing the signals received with the two beams 1 and converting the frequency of the multiplexed signal make it unnecessary to provide the frequency conversion unit equivalent in number to the beam. Furthermore, in general, an amplifier is included in the user link reception RF unit 22, although not illustrated in FIG. 3. In the present embodiment, similarly, it is also no longer necessary to provide the amplifier equivalent in number to the beam. Consequently, in the satellite repeater 2 of the present embodiment, the number of parts can be reduced as compared with a configuration in which the received signal is input to the channelizer on a beam-by-beam basis.

Figure 10:
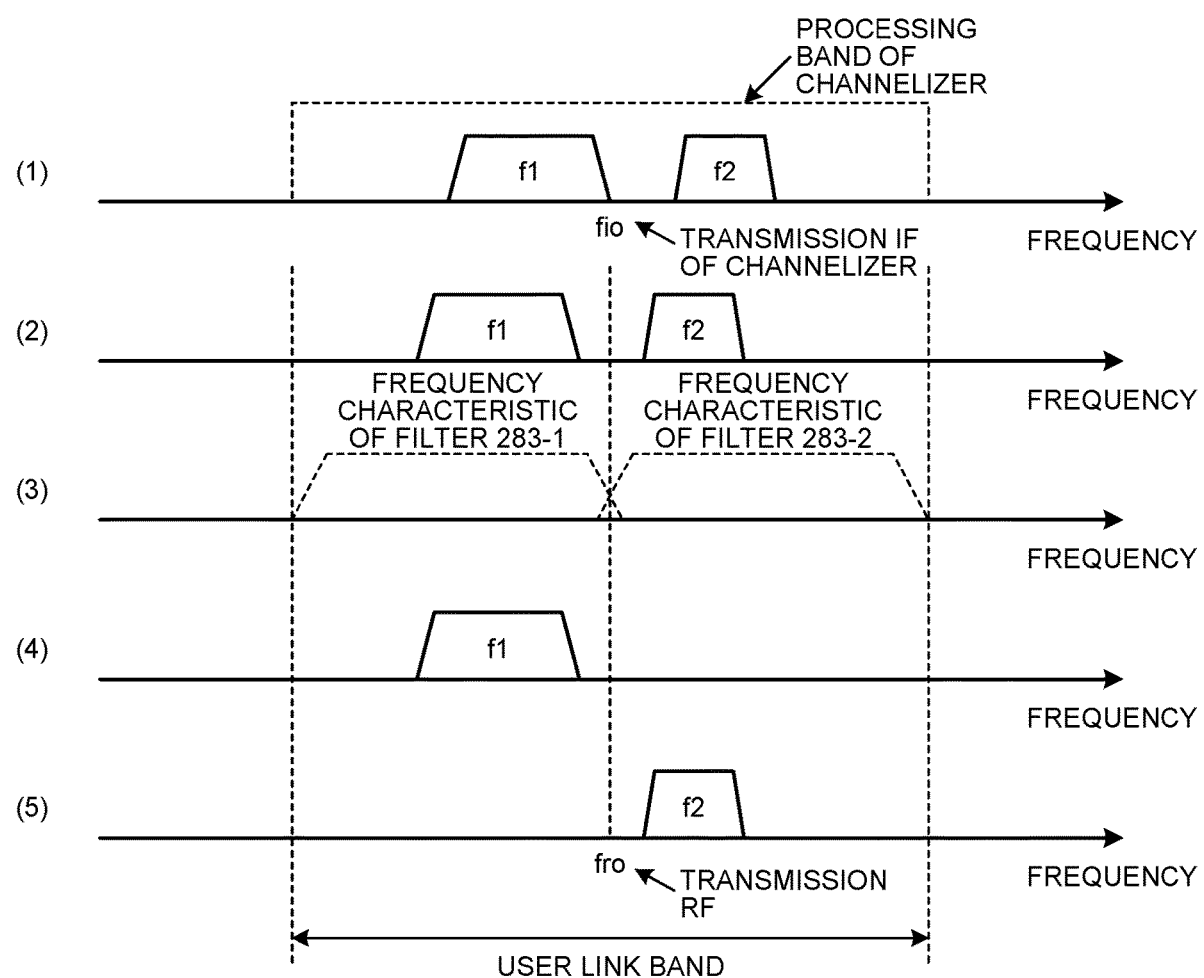
FIG. 10 is a diagram illustrating an operation example of the user link transmission RF unit when the satellite repeater relays a signal transmitted from a gateway to a terminal.

FIG. 10 is a diagram illustrating an operation example of the user link transmission RF unit 28 when the satellite repeater 2 relays a signal transmitted from the gateway 4 to the terminal 10. In the satellite repeater 2, upon receiving a radio signal from the gateway 4 with the beam 3, the feeder link reception RF unit 21 passes the received signal to the channelizer 23. In the example illustrated in FIG. 10, the signal transmitted from the gateway 4 includes: a signal addressed to the terminal 10 within the range of the beam 1-1; and a signal addressed to the terminal 10 within the range of the beam 1-2. The channelizer 23 demultiplexes the signal received from the feeder link reception RF unit 21, multiplexes the post-demultiplexing signals, in accordance with the routing table, and passes the multiplexed signal to the user link transmission RF unit 28.

As illustrated in (1) of FIG. 10, a signal in the processing band of the channelizer on the output side is input to the user link transmission RF unit 28. The processing band of the channelizer on the output side is a frequency band in which the signal can be output by the multiplexing unit 26 of the channelizer 23.

As illustrated in (2) of FIG. 10, the frequency conversion unit 281 of the user link transmission RF unit 28 converts the frequency of the signal input from the channelizer 23 such that a transmission IF fio matches a center frequency fro of the user link band for transmission. The frequency conversion unit 281 then passes the frequency-converted signal to the distributing unit 282. That is, the frequency conversion unit 281, which is a transmission frequency conversion unit, receives, from the channelizer 23, a signal including signal components transmitted by two beams belonging to the same cluster. The frequency conversion unit 281 then converts the frequency of the signal received from the channelizer 23. The distributing unit 282 duplicates the signal received from the frequency conversion unit 281, to thereby provide and distribute the two signals, such that each of the distributed two signals passes to a corresponding one of the filters 283-1 and 283-2. That is, the signal having the frequency converted by the frequency conversion unit 281 is distributed by the distributing unit 282 to two signals.

In FIG. 10, (3) illustrates the frequency characteristics of the filters 283-1 and 283-2. The characteristic of the filter 283-1 illustrated in (3) of FIG. 10 performs filtering on the signal, such that the filter 283-1 passes the filtered signal to the transmitting antenna 284-1. In FIG. 10, (4) illustrates the filtered signal provided by the filter 283-1. The characteristic of the filter 283-2 illustrated in (3) of FIG. 10 performs filtering on the signal, such that the filter 283-2 passes the filtered signal to the transmitting antenna 284-2. In FIG. 10, (5) illustrates the filtered signal provided by the filter 283-2. That is, the filters 283-1 and 283-2, which define a transmitting filter unit, have different frequency characteristics for performing the filtering on the two distributed signals. The transmitting antennas 284-1 and 284-2 transmit the received signals with the beams 1-1 and 1-2.

The user link transmission RF unit 28 of the present embodiment can receive one signal from the channelizer 23 for transmitting the signals with the two beams 1. The signal to be output from the channelizer 23 is a signal used in the exchanging processing by the channelizer 23. More specifically, when the user link transmission RF unit 28 is used, the signal used in the exchanging processing by the channelizer 23 includes a signal obtained by combining signals corresponding to beams defining one cluster. Since the signals to be transmitted with the two beams 1 is treated as a single signal and undergo the frequency conversion, it is no longer necessary to provide the frequency conversion unit equivalent in number to the beam. Furthermore, in general, an amplifier is included in the user link transmission RF unit 28, although not illustrated in FIG. 4. In the present embodiment, similarly, it is also no longer necessary to provide the amplifier equivalent in number to the beam. Consequently, in the satellite repeater 2 of the present embodiment, the number of parts can be reduced as compared with a configuration in which the signal to be transmitted is received from the channelizer on a beam-by-beam basis.

In the present embodiment, both of the user link reception RF unit 22 and the user link transmission RF unit 28 are used for carrying out processing for both of the reception and the transmission through the user link on the cluster-by-cluster basis. Alternatively, the configuration and operation of the present embodiment described above may be applied to either one of the reception and the transmission through the user link and the other may be carried out similarly to the conventional configuration and operation. That is, the satellite repeater 2 includes at least one of the user link reception RF unit 22, which is the reception processing unit, and the user link transmission RF unit 28, which is the transmission processing unit.

In the above example, the processing band of the channelizer and the user link band have the same bandwidth on both of the reception side and the transmission side of the user link; however, the processing band of the channelizer and the user link band may have different bandwidths. For example, a filter providing a bandwidth narrower than the user link bandwidth, but allowing two beams to pass therethrough may be provided following the frequency conversion unit 224. In this case, the bandwidth of the processing band of the channelizer can be narrower than the bandwidth of the user link band. Likewise, a filter may be provided preceding the frequency conversion unit 281, such that the bandwidth of the processing band of the channelizer can be narrower than the bandwidth of the user link band.

Next, the operation of the communication network control station 5 will be described. The communication network control station 5 determines the bandwidth allocated to each beam, the frequency arrangement of the user link, and the frequency arrangement of the feeder link and notifies the gateways 4-1 to **4-*j* of these determined items. Furthermore, the communication network control station 5 determines the frequency conversion amounts of the frequency conversion unit 224 and the frequency conversion unit 281 of the satellite repeater 2 and the routing table used by the switch unit 25, and notifies the satellite repeater 2** of these determined items.

In detail, the communication network control station 5 carries out the operation indicated below. The transmission/reception unit 51 of the communication network control station 5 receives control information from the gateway 4 and accumulates the received control information in the control information accumulating unit 52. The control information is information necessary for the resource control unit 55 to aggregate the required bands of respective beams, as described later. Specifically, the control information includes a traffic amount, that is, the data amount requested by each terminal 10 to transmit and receive, and the line quality when each terminal 10 and the gateway 4 communicate via the satellite repeater 2. The line quality may be, for example, the reception power measured by the terminal 10 or the error rate such as a packet error rate. The gateway 4 acquires these pieces of control information from the terminal 10, for example, via the satellite repeater 2.

The traffic monitoring unit 53 monitors the traffic amount requested by each terminal 10, which traffic amount is accumulated in the control information accumulating unit 52. The traffic monitoring unit 53 also performs a statistical process such as an averaging process on the traffic amount for each terminal 10 to work out the requested traffic amount for each terminal 10. The line quality monitoring unit 54 monitors the line quality of each terminal 10 accumulated in the control information accumulating unit 52 and performs statistical processing such as averaging process on the line quality for each terminal 10 to work out the post-statistical-processing line quality for each terminal 10.

Figure 11:
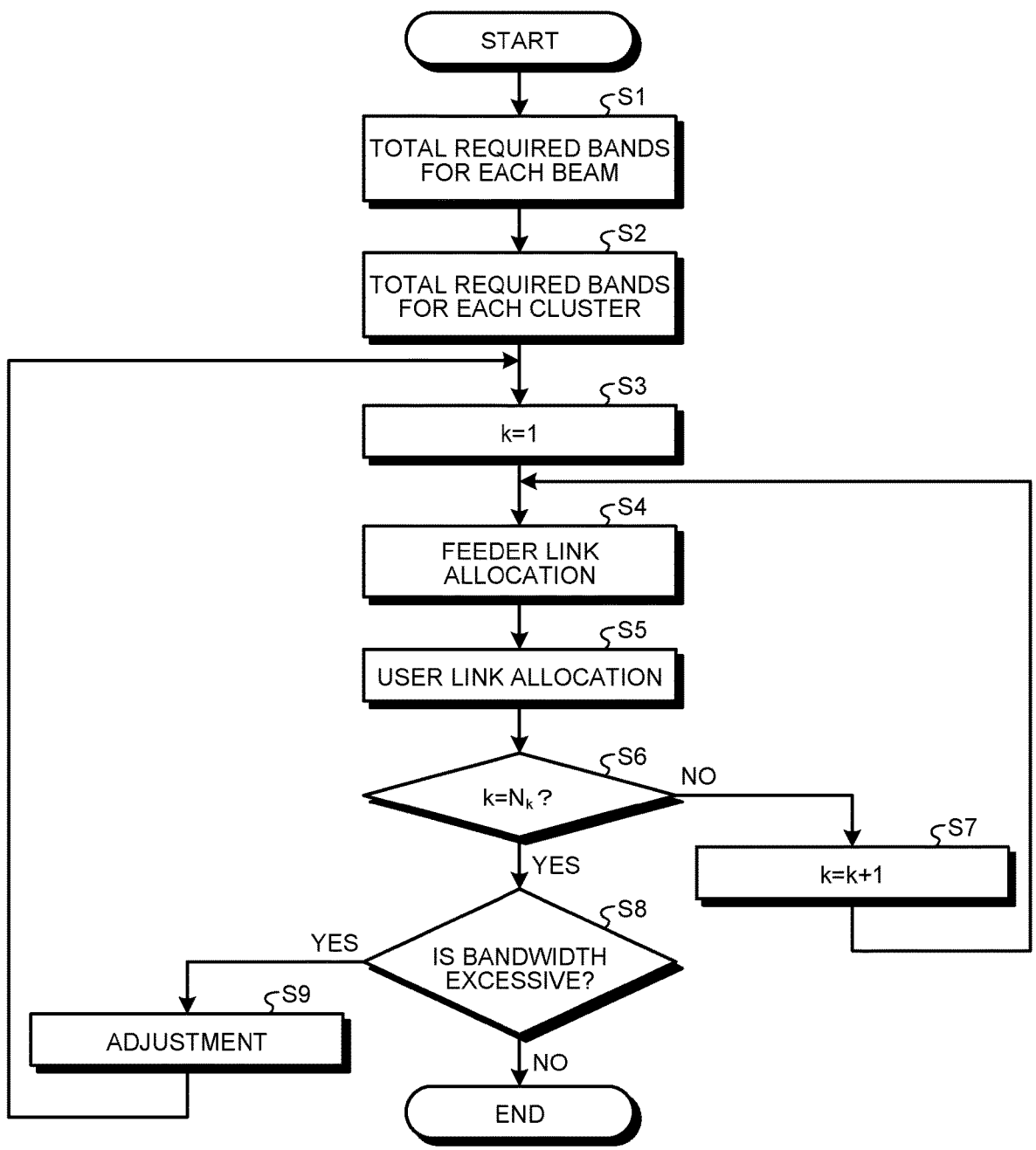
FIG. 11 is a flowchart illustrating an example of the operation of a resource control unit according to the first embodiment.

FIG. 11 is a flowchart illustrating an example of the operation of the resource control unit 55 according to the first embodiment. On the basis of the requested traffic amount and the post-statistical-processing line quality, the resource control unit 55 computes the required band necessary for each terminal 10 to transmit data. Using the computed result, the resource control unit 55 adds up the required bands for the residing terminals on the beam-by-beam basis by beam, thereby totaling the required bands for each beam (step S1). The required band means the bandwidth of the frequency necessary for transmission.

Next, the resource control unit 55 calculates the total value of the required bands for two beams defining the cluster, thereby totaling the required bands for each cluster (step S2). Note that the resource control unit 55 determines the frequency arrangement of the user link and the frequency arrangement of the feeder link before step S2 is carried out. The frequency arrangement of the user link means that the polarized wave and frequency is allocated to each beam, as illustrated in FIGS. 7 and 8, in the user link. The frequency arrangement of the feeder link means that the polarized wave and frequency is allocated to each beam, as illustrated in FIGS. 7 and 8, in the feeder link. Here, the combination of the beams defining the cluster should be determined in accordance with a rule prescribed in advance. This rule may be any rule as long as two beams defining the same cluster are allocated the same polarized wave and different frequencies in the user link. For example, as illustrated in FIGS. 7 and 8, the beam numbered a-1 and the beam numbered a-2, which are combined to define a cluster, are allocated the same polarized wave and the different frequency zones.

Since, in fact, the frequency allocation is allocated to each cluster, as will be described later, the frequency band, i.e., the bandwidth allocated to each beam is not determined in determining the beams defining the cluster. Though such a bandwidth is not determined, it is possible to determine the beams defining the cluster, by, as described with reference to FIGS. 7 and 8, determining the beams using the same polarized wave and the beams using different frequencies in the same group. That is, the center frequency and the maximum bandwidth of the frequency band allocated to each beam should be predetermined such that band allocation described later is carried out within the range of the maximum bandwidth of each beam. Note that it is desirable that the frequencies allocated to the beams of the same cluster be adjacent to each other. This is because, in a case where the frequency zones allocated to the beams of the same cluster are not adjacent to each other, an unused frequency band is included in the user link bandwidth of the combined signal provided by the combining unit 223 and, as a consequence, the user link bandwidth is widened.

Next, the resource control unit 55 sets k, which is a variable indicating the cluster number, to "1" (step S3), and allocates the band of the feeder link to the k-th cluster (step S4). Furthermore, the resource control unit 55 allocates the band of the user link to the k-th cluster (step S5). In allocating the band of the user link for transmission, the required band for each beam is regarded as the bandwidth allocated to each beam. It is noted that the bandwidth to be allocated to the two beams defining the cluster should be in a range within which each of the respective filters 222-1 and 222-2 can perform the filtering. When the bandwidth allocated to the two beams defining the cluster goes beyond the range within which each of the filters 222-1 and 222-2 can perform the filtering, the resource control unit 55 judges the bandwidth to be excessive and then proceeds to the next step. In allocating the band of the user link for reception, the required band for each beam is regarded as the bandwidth allocated to each beam. However, the bandwidth to be allocated to the two beams defining the cluster should be in a range within which each of the filters 283-1 and 283-2 can perform the filtering. When the bandwidth allocated to two beams defining the cluster goes beyond the range within which each of the filters 283-1 and 283-2 can perform the filtering, the resource control unit 55 judges the bandwidth to be excessive and then proceeds to the next step. Although any method for allocating the frequency band of the feeder link may be employed, the frequency band of the feeder link may be allocated using a method similar to the method of the frequency allocation for the user link. Note that the frequency characteristics of the filters 222-1 and 222-2 and the filters 283-1 and 283-2 are predetermined such that each of the filters 222-1, 222-2 allows passage of a signal having the maximum bandwidth allocated to the corresponding beam.

Next, the resource control unit 55 judges whether k is $N_k$ (step S6). $N_k$ represents the number of clusters. In other words, in step S6, the resource control unit 55 judges whether frequency allocation has been performed for all the clusters. When k is not $N_k$ (step S6, No), the resource control unit 55 updates k to k+1 (step S7) and repeats the processes from step S4.

When k is $N_k$ (step S6, Yes), the resource control unit 55 determines whether the bandwidth is excessive (step S8). In allocating the frequency of the user link, the criterion for determining whether or not the bandwidth is excessive is whether or not the sum of the bandwidths allocated to the individual clusters exceeds the processing band of the channelizer 23. In allocating the frequency of the feeder link, the criterion for determining whether or not the bandwidth exceeds the processing band is whether or not the sum of the bandwidths allocated to all the clusters exceeds the maximum bandwidth of the feeder link.

When the bandwidth is excessive (step S8, Yes), the resource control unit 55 performs adjustment so as to reduce the allocated band of each beam (step S9) and repeats the processes from step S3. The adjustment in step S9 is carried out in such a manner that, for example, according to the priority depending on the contract form of each terminal 10 or the priority of the data to be transmitted and received by each terminal 10, a band to be allocated is reduced by a certain amount or by a certain percentage in ascending order of priority.

When the bandwidth is not excessive (step S8, No), the resource control unit 55 terminates the process. Through the processes described above, the bandwidth allocated to the cluster is determined. Note that, when it is determined in above step S8 that the bandwidth is excessive, the resource control unit 55 judges that the bandwidth to be excessive.

The resource control unit 55 transmits the bandwidth allocated to each beam by the processes illustrated in FIG. 11, the frequency arrangement of the user link, and the frequency arrangement of the feeder link to the gateway 4 via the transmission/reception unit 51.

With these processes, the resource control unit 55 can also work out the frequency conversion amounts of the frequency conversion unit 224 and the frequency conversion unit 281 of the satellite repeater 2 on the basis of the center frequency of the processing band of the channelizer 23 on each of the input side and output side for each cluster and the center frequency of the user link band. Furthermore, the resource control unit 55 determines the routing information used by the switch unit 25 on the basis of the terminal 10 present in the range of the beams constituting each cluster and the destination of the signal transmitted from the terminal 10. The communication network control station 5 notifies the satellite repeater 2 of the frequency conversion amounts of the frequency conversion unit 224 and the frequency conversion unit 281 and the routing information via a satellite communication unit of the communication network control station 5 (not illustrated) or a satellite control station (not illustrated).

The satellite repeater 2 includes transmission/reception unit (not illustrated) for receiving the frequency conversion amounts of the frequency conversion unit 224 and the frequency conversion unit 281 and the routing information, for example, through a communication line different from the user link and the feeder link. The repeater control unit 30 of the satellite repeater 2 passes the routing information to the channelizer 23, provides the frequency conversion unit 224 with the frequency conversion amount of the frequency conversion unit 224, and provides the frequency conversion unit 281 with the frequency conversion amount of the frequency conversion unit 281.

Note that, as described above, the number of beams constituting the cluster may be three or more. For the frequency arrangement of the individual beams illustrated in FIGS. 7 and 8, these beams are categorized into two frequencies. In a case where the number of beams defining the cluster is three or more, for example, the beams can be simply categorized into the number of beams defining the cluster, instead of the frequency arrangement illustrated in FIGS. 7 and 8.

Note that although the above description gives the operation example in which the terminal 10 performs communication by way of the gateway 4, the satellite repeater 2 can also relay the communication between the terminal 10 and another terminal 10. In this case, the channelizer 23 of the satellite repeater 2 outputs the signal received from the user link reception RF unit 22 to the user link transmission RF unit 28 in accordance with the routing table.

As described thus far, in transmitting data between the terminal 10 and the gateway 4 via the satellite repeater 2, the satellite communication system 200 according to the present embodiment converts the frequencies of the signals transmitted from the terminal 10 or the signals received by the terminal 10 at once on the cluster-by-cluster basis, the cluster being made up of the two beams. Accordingly, the satellite communication system 200 according to the present embodiment can use the channelizer 23 capable of responding to a change in communication demand and provide the reduced number of input/output ports of the channelizer 23. As a result, it is not necessary to provide the frequency conversion unit equivalent in number to the beam, such that the number of parts can be reduced as compared with a configuration in which the received signal is input to the channelizer on the beam-by-beam basis.

Second Embodiment

Figure 12:
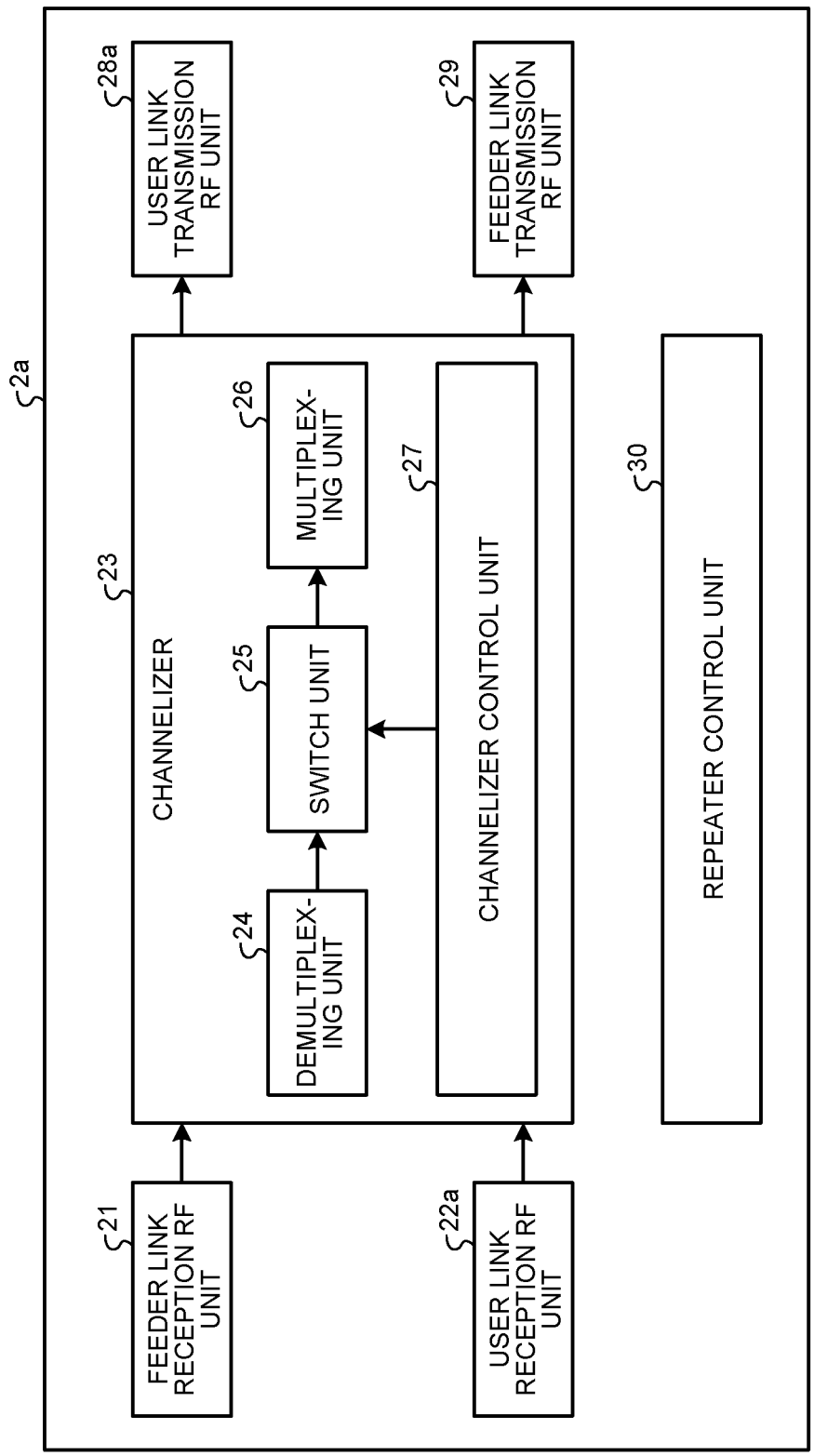
FIG. 12 is a diagram illustrating a configuration example of a satellite repeater according to a second embodiment.

FIG. 12 is a diagram illustrating a configuration example of a satellite repeater 2a according to a second embodiment of the present invention. The configuration of the satellite communication system of the present embodiment is similar to the configuration of the first embodiment except that the satellite repeater 2a is provided instead of the satellite repeater 2 of the first embodiment. As illustrated in FIG. 12, the satellite repeater 2a of the present embodiment is similar to the satellite repeater 2 of the first embodiment except that a user link reception RF unit 22a and a user link transmission RF unit 28a are provided instead of the user link reception RF unit 22 and the user link transmission RF unit 28 of the first embodiment, respectively. Elements having functions similar to those in the first embodiment are denoted by the same reference numerals as those in the first embodiment and redundant explanations will be omitted. Hereinafter, differences from the first embodiment will be mainly described.

In the first embodiment, the number of parts of the repeater is reduced by allocating the frequencies of the individual beams such that the frequencies serve as the boundary of the filters and converting the frequencies of the two beams at once. In the first embodiment, as illustrated in FIG. 9, also, there is the requirement that the bandwidth allocated to each beam be half of the user link band at the maximum. In the present embodiment, the satellite repeater 2a capable of increasing the bandwidth allocated to each beam as compared with the first embodiment will be described.

Figure 13:
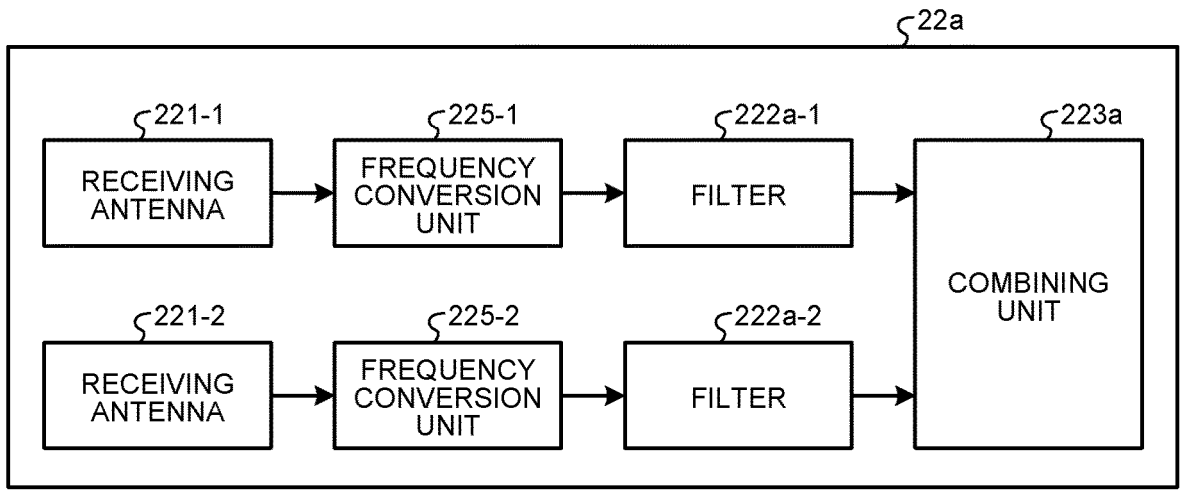
FIG. 13 is a diagram illustrating a configuration example of a user link reception RF unit according to the second embodiment.

FIG. 13 is a diagram illustrating a configuration example of the user link reception RF unit 22a according to the present embodiment. The user link reception RF unit 22a, which is the reception processing unit of the present embodiment, includes the receiving antennas 221-1 and 221-2 similar to those in the first embodiment, frequency conversion units 225-1 and 225-2, filters 222a-1 and 222a-2, and a combining unit 223a.

Figure 14:
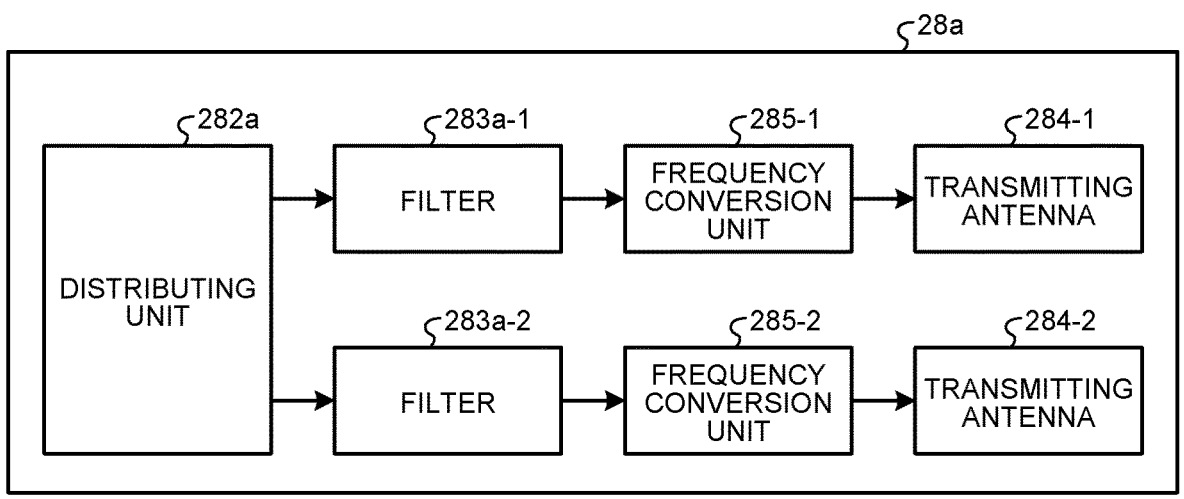
FIG. 14 is a diagram illustrating a configuration example of a user link transmission RF unit according to the second embodiment.

FIG. 14 is a diagram illustrating a configuration example of the user link transmission RF unit 28a according to the second embodiment. The user link transmission RF unit 28a, which is the transmission processing unit of the present embodiment, includes a distributing unit 282a, filters 283a-1 and 283a-2, frequency conversion units 285-1 and 285-2, and the transmitting antennas 284-1 and 284-2 similar to those in the first embodiment.

Each unit illustrated in FIGS. 13 and 14 is all implemented by an apparatus or a processing circuit similarly to each unit of the user link reception RF unit 22 and the user link transmission RF unit 28 of the first embodiment. The processing circuit may be dedicated hardware or the control circuit 500 illustrated in FIG. 6.

Figure 15:
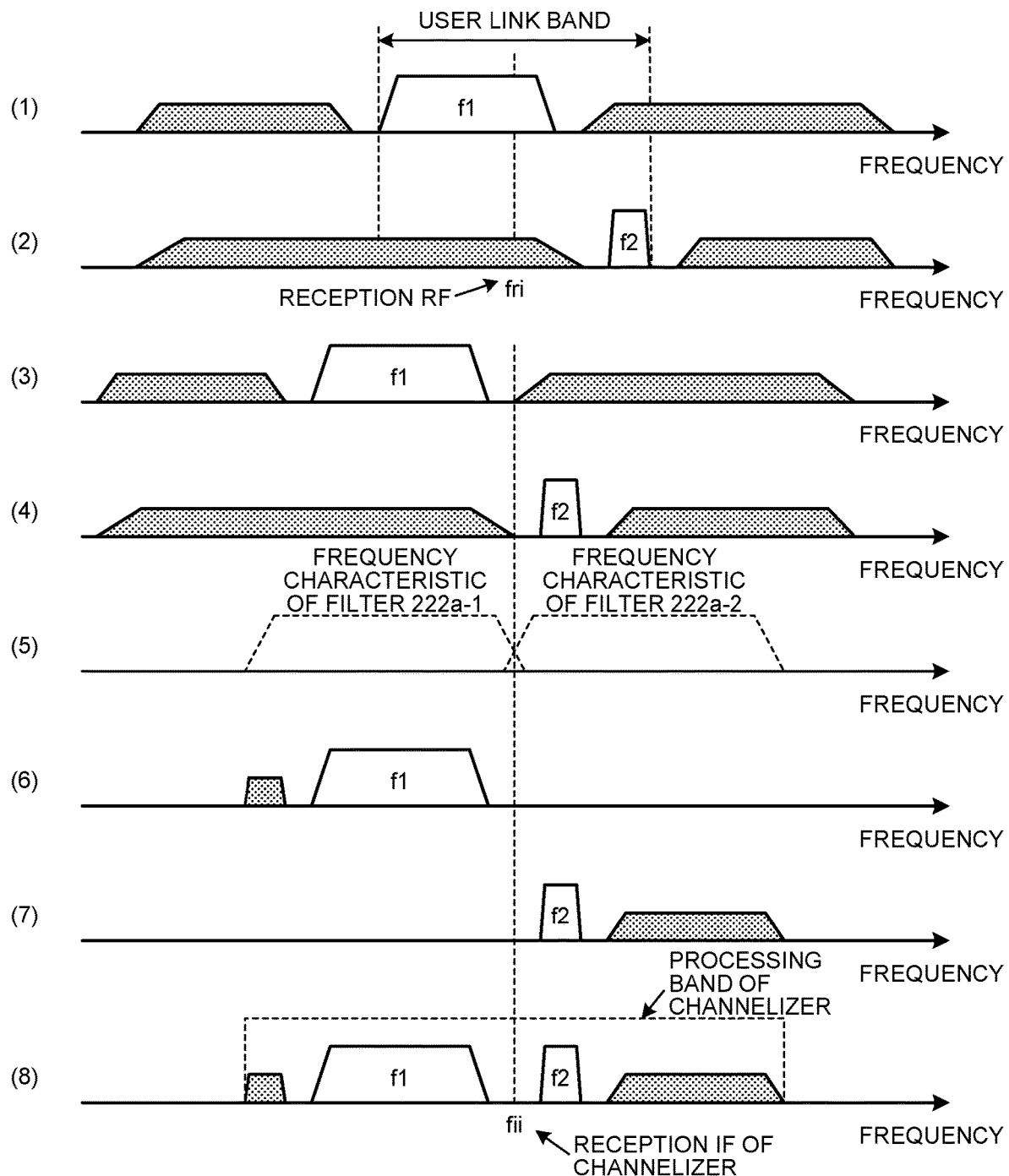
FIG. 15 is a diagram illustrating an action example when the satellite repeater according to the second embodiment relays a signal transmitted from a terminal to a gateway.

FIG. 15 is a diagram illustrating an action example when the satellite repeater 2a according to the present embodiment relays a signal transmitted from the terminal 10 to the gateway 4. The operation of the user link reception RF unit 22a will be described with reference to FIGS. 13 and 15. The present embodiment makes it possible to allocate the entire user link band to each beam at the maximum. In the first embodiment, the user link band is divided into two in advance; in the present embodiment, however, it is possible to change the bandwidth allocatable to two beams defining the cluster. Therefore, in determining the frequency arrangement, the communication network control station 5 of the present embodiment allocates a larger band to one of the two beams of the cluster than to the other beam in a case where the required band for the one beam is larger than the required band for the other beam. In addition, when the terminal 10 is not present in the range of one of the beams of the cluster, the communication network control station 5 allocates the entire user link band to the other of the cluster.

In FIG. 15, (1) illustrates a signal received by the receiving antenna 221-1 of the satellite repeater 2a, while (2) of FIG. 15 illustrates a signal received by the receiving antenna 221-2 of the satellite repeater 2a. FIG. 15 illustrates an example in which the beams 1-1 and 1-2 define the cluster and the required band for the beam 1-1 is larger than the required band for the beam 1-2. Therefore, the bandwidth of the frequency band f1 allocated to the beam 1-1 is wider than the bandwidth of the frequency band f2 allocated to the beam 1-2. Accordingly, if the filters similar to those in the first embodiment are used to perform the filtering, a part of the signal from the terminal 10 received by the beam 1-1 will be lost.

In the present embodiment, the frequencies of the signals received by the receiving antennas 221-1 and 221-2 are converted by the frequency conversion units 225-1 and 225-2, respectively. In FIG. 15, (3) illustrates a signal having the frequency converted by the frequency conversion unit 225-1, while (4) of FIG. 15 illustrates a signal having the frequency converted by the frequency conversion unit 225-2. As illustrated in (3) and (4) of FIG. 15, the frequency conversion units 225-1 and 225-2 perform the frequency conversion such that the boundary between the frequency zones f1 and f2 matches the reception IF fii that is the center frequency of the processing band of the channelizer on the input side. That is, the frequency conversion units 225-1 and 225-2, which serve as the reception frequency conversion unit, convert the frequencies of the respective signals received by two beams belonging to the same cluster.

In FIG. 15, (5) illustrates the frequency characteristics of the filters 222a-1 and 222a-2. As illustrated in (5) of FIG. 15, the filter 222a-1 has a frequency characteristic that extracts a signal at frequencies lower than the reception IF fii in a frequency band of the bandwidth of the user link band and removes a signal in other frequency bands. The filter 222a-2 has a frequency characteristic that extracts a signal at frequencies higher than the reception IF fii in a frequency band of the bandwidth of the user link band and removes a signal in other frequency bands. In addition, as illustrated in (5) of FIG. 15, the frequency characteristics of the filters 222a-1 and 222a-2 are set adjacent to each other. That is, the filters 222a-1 and 222a-2 defining a receiving filter unit have different frequency characteristics for performing filtering on the two signals having the frequencies converted by the frequency conversion units 225-1 and 225-2.

The filters 222a-1 and 222a-2 perform the filtering on the signals having the frequencies converted by the frequency conversion units 225-1 and 225-2, respectively. In FIG. 15, (6) and (7) illustrate filtered signals provided by the filters 222a-1 and 222a-2, respectively. The filters 222a-1 and 222a-2 pass the filtered signals to the combining unit 223a. The combining unit 223a combines the signals received from the filters 222a-1 and 222a-2 and outputs the combined signal to the channelizer 23. That is, the combining unit 223a combines the signals processed by the filters 222a-1 and 222a-2, and outputs the combined signal to the channelizer 23 as one combined signal. In FIG. 15, (8) illustrates a combined signal provided by the combining unit 223a.

The operation of the satellite repeater 2a after the combined signal provided by the combining unit 223a is input to the channelizer 23 is similar to the operation in the first embodiment.

Figure 16:
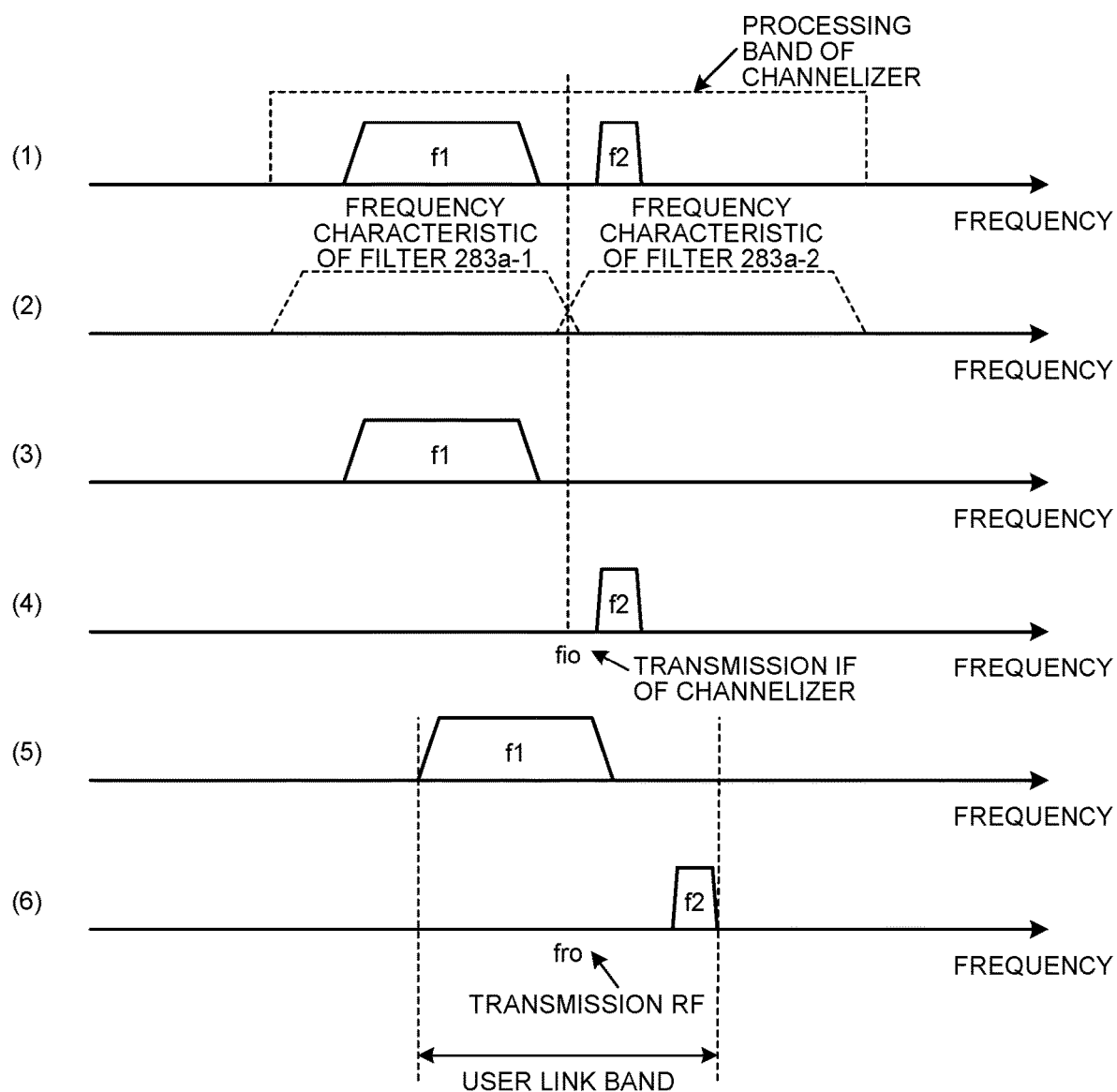
FIG. 16 is a diagram illustrating an operation example when the satellite repeater according to the second embodiment relays a signal transmitted from a gateway to a terminal.

FIG. 16 is a diagram illustrating an operation example when the satellite repeater 2a according to the present embodiment relays a signal transmitted from the gateway 4 to the terminal 10. The operation of the user link transmission RF unit 28a of the present embodiment will be described with reference to FIGS. 14 and 16.

The operation until the signal transmitted from the gateway 4 is received by the satellite repeater 2a and input to the channelizer 23 is similar to the operation in the first embodiment. In FIG. 16, (1) illustrates a signal output from the channelizer 23 to the user link transmission RF unit 28a. As illustrated in (1) of FIG. 16, a signal including signals associated with two beams is output from the channelizer 23. The distributing unit 282a duplicates the signal output from the channelizer 23 and outputs each of the duplicated signals to the corresponding one of the filters 283a-1 and 283a-2. That is, the distributing unit 282a receives, from the channelizer 23, a signal including signal components transmitted with the two beams belonging to the same cluster, and distributes the signal received from the channelizer 23 to two signals.

In FIG. 16, (2) illustrates the frequency characteristics of the filters 283a-1 and 283a-2. As illustrated in (2) of FIG. 16, the frequency bands extracted by the filters 283a-1 and 283a-2 are adjacent to each other. The filter 283a-1 has a frequency characteristic that extracts a signal at frequencies lower than the transmission IF fio in a frequency band of the bandwidth of the user link band and removes a signal in other frequency bands. The transmission IF fio is the center frequency of the processing band of the channelizer on the output side. In addition, the filter 283a-2 has a frequency characteristic that extracts a signal at frequencies higher than the transmission IF fio in a frequency band of the bandwidth of the user link band and removes a signal in other frequency bands. That is, the filters 283a-1 and 283a-2, which define a transmitting filter unit, have different frequency characteristics for performing filtering on the two signals distributed by the distributing unit 282a.

In FIG. 16, (3) and (4) illustrate filtered signals provided by the filters 283a-1 and 283a-2, respectively. The filters 283a-1 and 283a-2 pass the filtered signals to the frequency conversion units 285-1 and 285-2, respectively. The frequency conversion units 285-1 and 285-2 convert the frequencies of the signals output from the filters 283a-1 and 283a-2, respectively, such that the two input signals fall within the user link band. That is, the frequency conversion units 285-1 and 285-2 convert the frequencies of the signals output from the filters 283a-1 and 283a-2 such that the transmission IF fio of the channelizer matches a frequency at the boundary between the frequency zone of the beam 1-1 and the frequency zone allocated to the beam 1-2. In FIG. 16, (5) and (6) illustrate signals having the frequencies converted by the frequency conversion units 285-1 and 285-2, respectively. The frequency conversion units 285-1 and 285-2 output the frequency-converted signals to the transmitting antennas 284-1 and 284-2, respectively. That is, each of the frequency conversion units 285-1 and 285-2, which define the transmission frequency conversion unit, converts the frequency of the corresponding one of the two filtered signals provided by the transmitting filter unit.

In the present embodiment, the communication network control station 5 calculates the frequency conversion amounts of the frequency conversion units 225-1 and 225-2 and the frequency conversion units 285-1 and 285-2 on the basis of and the processing band of the channelizer and the frequency at the boundary between the bands allocated to individual beams defining the cluster.

Note that, in the example described above, the frequency conversion units 225-1 and 225-2 perform the frequency conversion to convert the frequency at the borderline between the frequency zones allocated to individual beams into the reception IF. The frequency conversion units 285-1 and 285-2 perform the frequency conversion to convert the transmission IF into the frequency at the borderline between the frequency zones allocated to individual beams. Alternatively, the frequency conversion units 225-1 and 225-2 may convert a first reception RF into a second reception RF where the first reception RF is the above-mentioned frequency at the borderline between the frequency zones allocated to individual beams. That is, the frequency conversion may be performed stepwise to provide the reception IF. In this case, a frequency conversion unit configured to convert the second reception RF into the reception IF is provided following the combining unit 233a. Similarly, the frequency conversion units 285-1 and 285-2 may convert a "second" transmission RF into a first transmission RF where the first transmission RF is the above-mentioned frequency at the borderline between the frequency zones allocated to individual beams. That is, the frequency conversion may be performed stepwise to provide the first transmission RF. In this case, a frequency conversion unit configured to convert a transmission IF into the "second" transmission RF is provided preceding the distributing unit 282a.

As described thus far, in the present embodiment, it is possible to use the channelizer 23 capable of responding to a change in communication demand and reduce the number of input/output ports of the channelizer 23. Accordingly, the number of parts can be reduced as compared with a configuration in which the received signal is input to the channelizer on the beam-by-beam basis. Furthermore, compared with the first embodiment, the maximum value of the bandwidth allocatable to each beam can be expanded.

Although above description gives an example in which one cluster is made up of two beams and the relay processing is performed on the cluster-by-cluster basis, the number of beams defining the cluster may be three or more as in the first embodiment. Also in this case, the communication network control station 5 should make allocation such that the user link band does not overlap between three beams of the same cluster. Where the number of beams defining the cluster is three or more, for example, two beams are defined as one set and the frequencies thereof are arranged adjacent to each other; then, the frequency is allocated such that a different set is placed outside the pass band of the filter characteristic corresponding to each set. Furthermore, the processing band of the channelizer covers the filter characteristic equivalent in number to the beam defining the cluster.

Third Embodiment

Figure 17:
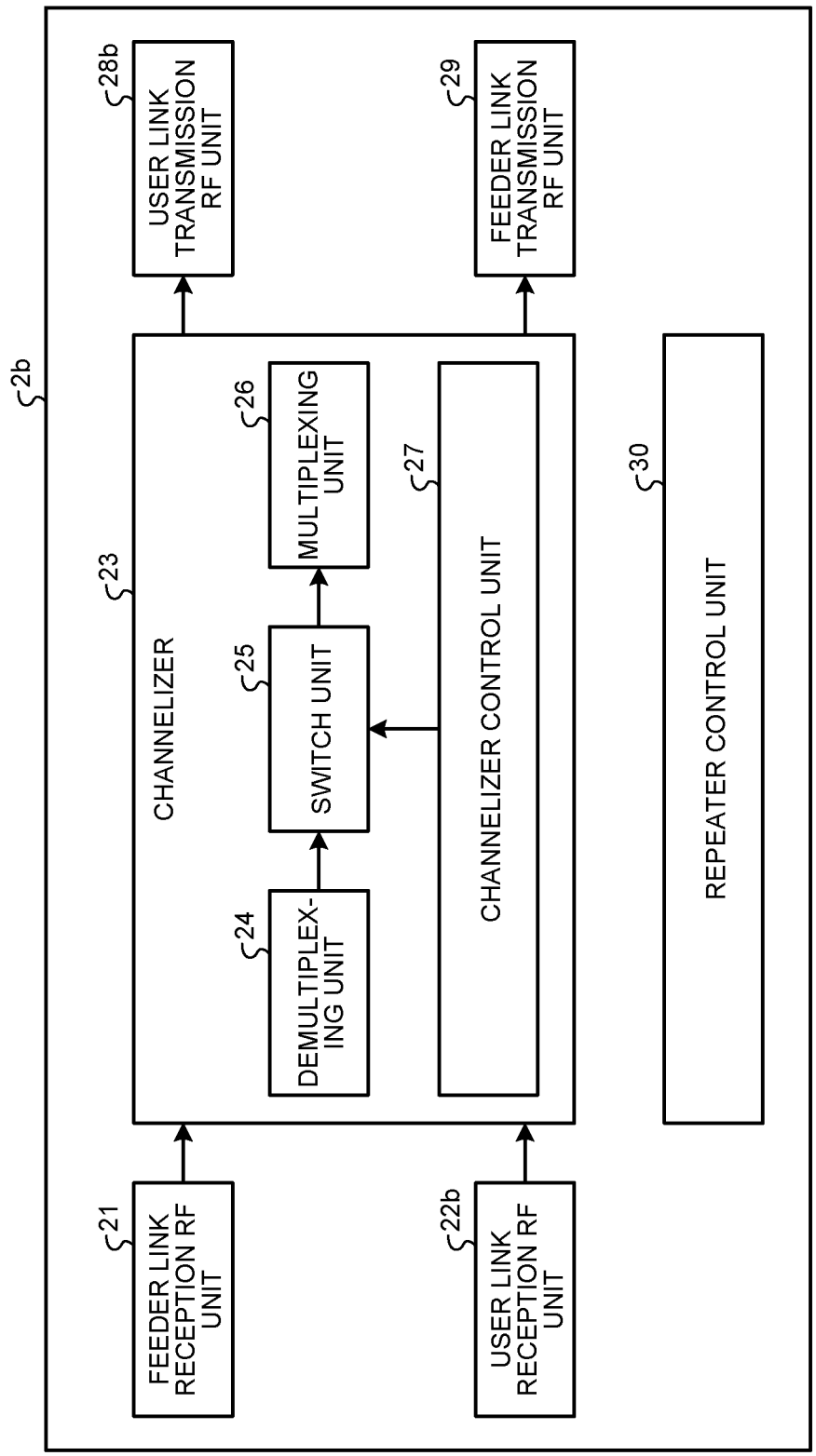
FIG. 17 is a diagram illustrating a configuration example of a satellite repeater according to a third embodiment.

FIG. 17 is a diagram illustrating a configuration example of a satellite repeater 2b according to a third embodiment of the present invention. The configuration of the satellite communication system of the present embodiment is similar to the configuration of the second embodiment except that the satellite repeater 2b is provided instead of the satellite repeater 2a of the second embodiment. As illustrated in FIG. 17, the satellite repeater 2b of the present embodiment is similar to the satellite repeater 2a of the second embodiment except that a user link reception RF unit 22b and a user link transmission RF unit 28b are provided instead of the user link reception RF unit 22a and the user link transmission RF unit 28a of the second embodiment, respectively. Elements having functions similar to those in the first or second embodiment are denoted by the same reference numerals as those in the first or second embodiment and redundant explanations will be omitted. Hereinafter, differences from the second embodiment will be mainly described.

In the second embodiment, a method capable of increasing the size of the band allocatable to one beam as compared with the first embodiment has been described. Meanwhile, in the second embodiment, it is necessary to increase the processing band of the channelizer as compared with the first embodiment. This is because the frequency bands allocated to individual beams need to secure an amount equivalent to the user link band on both sides of the boundary between the lower frequency zone and the higher frequency zone. Thus, the present embodiment will indicate a configuration example and an operation example that can make the processing band of the channelizer equal to the processing band in the first embodiment.

Figure 18:
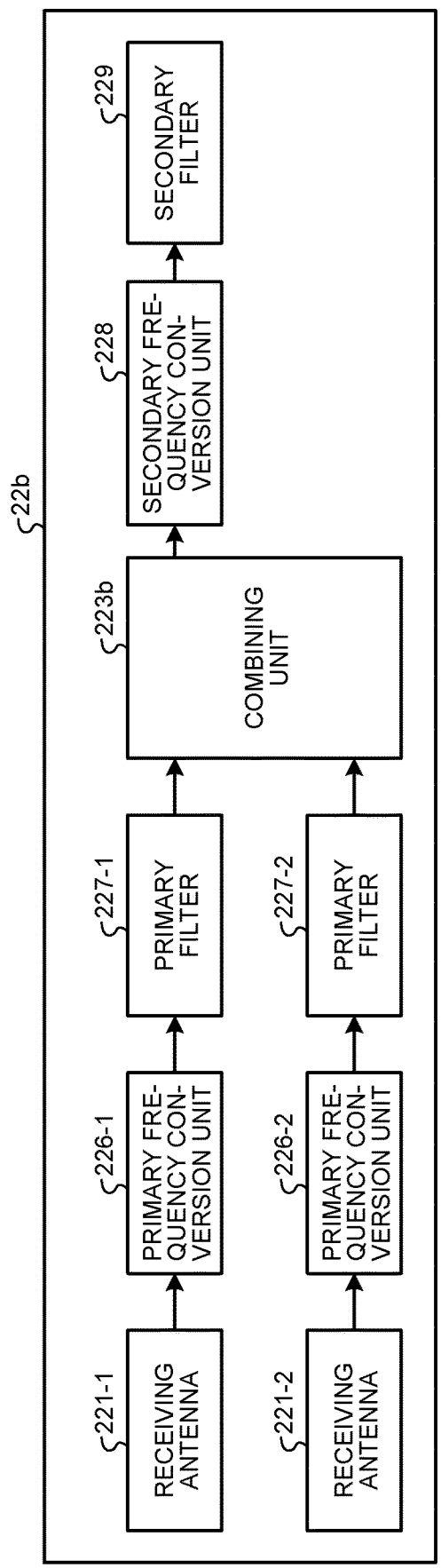
FIG. 18 is a diagram illustrating a configuration example of a user link reception RF unit according to the third embodiment.

FIG. 18 is a diagram illustrating a configuration example of the user link reception RF unit 22b according to the third embodiment. As illustrated in FIG. 18, the user link reception RF unit 22b, which is the reception processing unit, includes the receiving antennas 221-1 and 221-2 similar to those in the first embodiment, primary frequency conversion units 226-1 and 226-2, primary filters 227-1 and 227-2, a combining unit 223b, a secondary frequency conversion unit 228, and a secondary filter 229.

Figure 19:
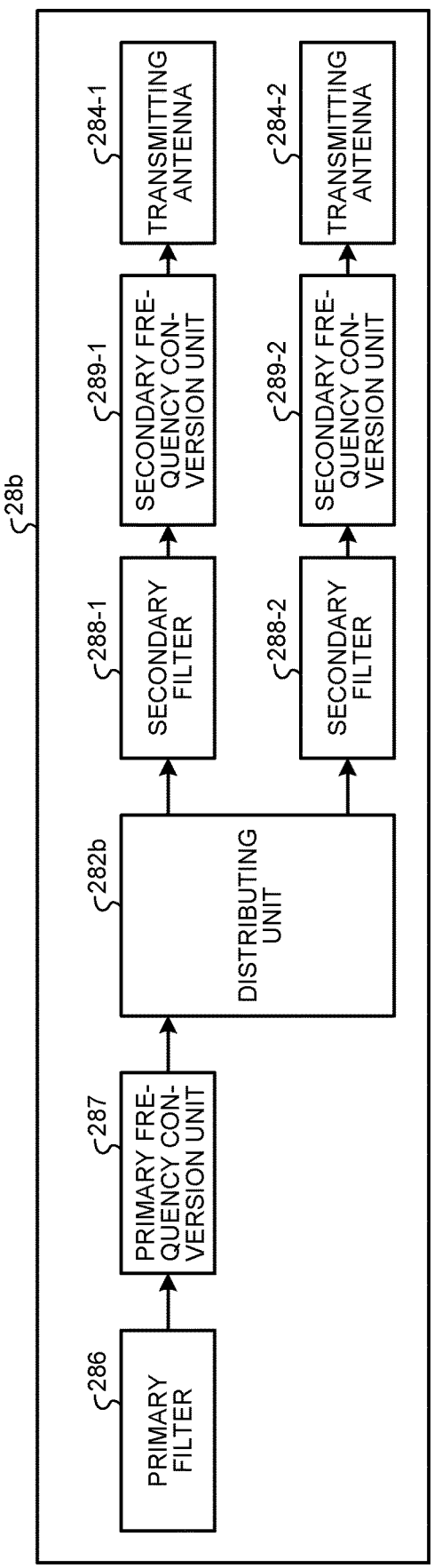
FIG. 19 is a diagram illustrating a configuration example of a user link transmission RF unit according to the third embodiment.

FIG. 19 is a diagram illustrating a configuration example of the user link transmission RF unit 28b according to the third embodiment. As illustrated in FIG. 19, the user link transmission RF unit 28b, which is the transmission processing unit, includes a primary filter 286, a primary frequency conversion unit 287, a distributing unit 282b, secondary filters 288-1 and 288-2, secondary frequency conversion units 289-1 and 289-2, and the transmitting antennas 284-1 and 284-2 similar to those in the first embodiment.

Each unit illustrated in FIGS. 18 and 19 is all implemented by an apparatus or a processing circuit similarly to each unit of the user link reception RF unit 22 and the user link transmission RF unit 28 of the first embodiment. The processing circuit may be dedicated hardware or the control circuit 500 illustrated in FIG. 6.

Figure 20:
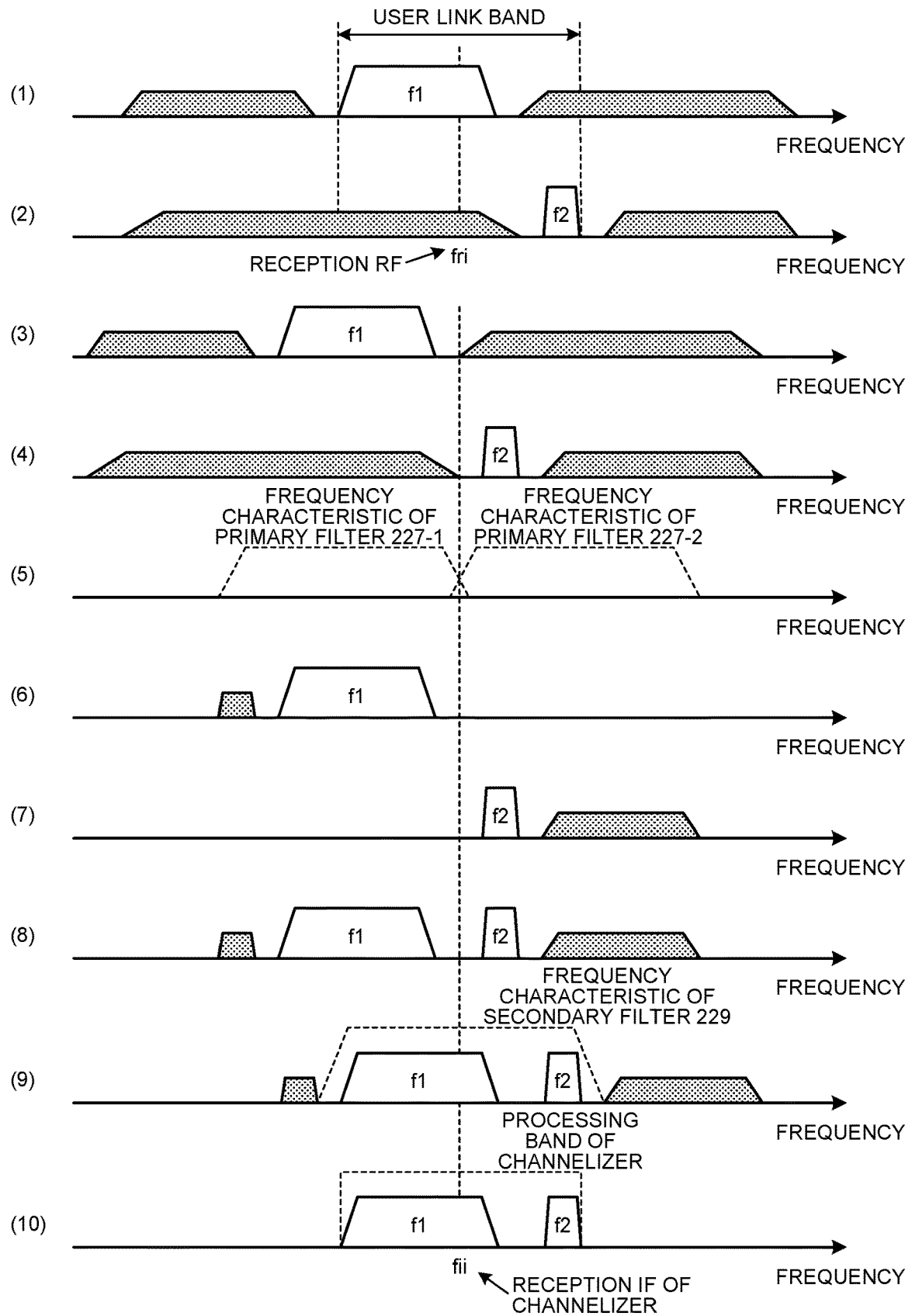
FIG. 20 is a diagram illustrating an operation example when the satellite repeater according to the third embodiment relays a signal transmitted from a terminal to a gateway.

FIG. 20 is a diagram illustrating an operation example when the satellite repeater 2b according to the present embodiment relays a signal transmitted from the terminal 10, to the gateway 4. The communication network control station 5 according to the present embodiment allocates the band to each beam of the user link in the manner similar to the method in the second embodiment. In FIG. 20, (1) illustrates a signal received by the receiving antenna 221-1 of the satellite repeater 2b, while (2) of FIG. 20 illustrates a signal received by the receiving antenna 221-2 of the satellite repeater 2b.

The primary frequency conversion units 226-1 and 226-2 perform frequency conversion similarly to the frequency conversion units 225-1 and 225-2 of the second embodiment. That is, each of the primary frequency conversion units 226-1 and 226-2, which define a primary reception frequency conversion unit, converts the corresponding one of the frequencies of the signals received with two beams belonging to the same cluster, into a first frequency zone. In FIG. 20, (3) and (4) illustrate signals having the frequencies converted by the primary frequency conversion units 226-1 and 226-2, respectively. In FIG. 20, (5) illustrates the frequency characteristics of the primary filters 227-1 and 227-2. Each of the primary filters 227-1 and 227-2 performs filtering on the corresponding one of the signals having the frequencies converted by the primary frequency conversion units 226-1 and 226-2. That is, each of the primary filters 227-1 and 227-2, which define a primary receiving filter unit, performs filtering on the corresponding one of the signals having the frequencies converted by the primary frequency conversion units 226-1 and 226-2. In FIG. 20, (6) and (7) illustrate the filtered signals provided by the primary filters 227-1 and 227-2, respectively. In FIG. 20, (8) illustrates a combined signal provided by the combining unit 223b.

The combining unit 223b combines the signals received from the primary filters 227-1 and 227-2 and passes the combined signal to the secondary frequency conversion unit 228. That is, the combining unit 223b combines the signals processed by the primary filters 227-1 and 227-2, thereby generating one combined signal. The secondary frequency conversion unit 228 converts the frequency of the combined signal such that a signal in a desired frequency band can be extracted with a frequency characteristic of the secondary filter 229 described later. That is, the secondary frequency conversion unit 228, which is a secondary reception frequency conversion unit, converts the frequency of the combined signal provided by the combining unit 223b, into a second frequency zone. The frequency characteristic of the secondary filter 229 is a frequency characteristic for extracting a signal in the user link band after the frequency conversion that converts the reception RF fri into the reception IF fii and removing a signal in other frequency zones. The reception RF fri is the center frequency of the user link frequency. The reception IF fii is the center frequency of the processing band of the channelizer. That is, the frequency characteristic of the secondary filter 229 is a frequency characteristic for extracting a signal in the user link band shifted by a difference between fii and fri and removing a signal in other frequency bands.

In FIG. 20, (9) illustrates a signal having undergone the frequency conversion by the secondary frequency conversion unit 228. The secondary frequency conversion unit 228 passes the frequency-converted signal to the secondary filter 229. In FIG. 20, (10) illustrates a filtered signal provided by the secondary filter 229. The secondary filter 229 passes the filtered signal to the channelizer 23. That is, the secondary filter 229, which is a secondary receiving filter unit, performs filtering on the signal having the frequency converted by the secondary frequency conversion unit 228, and outputs the filtered signal to the channelizer 23.

Through the processes thus far, in the present embodiment, the processing band of the channelizer 23 on the input side can be reduced as compared with the second embodiment.

Figure 21:
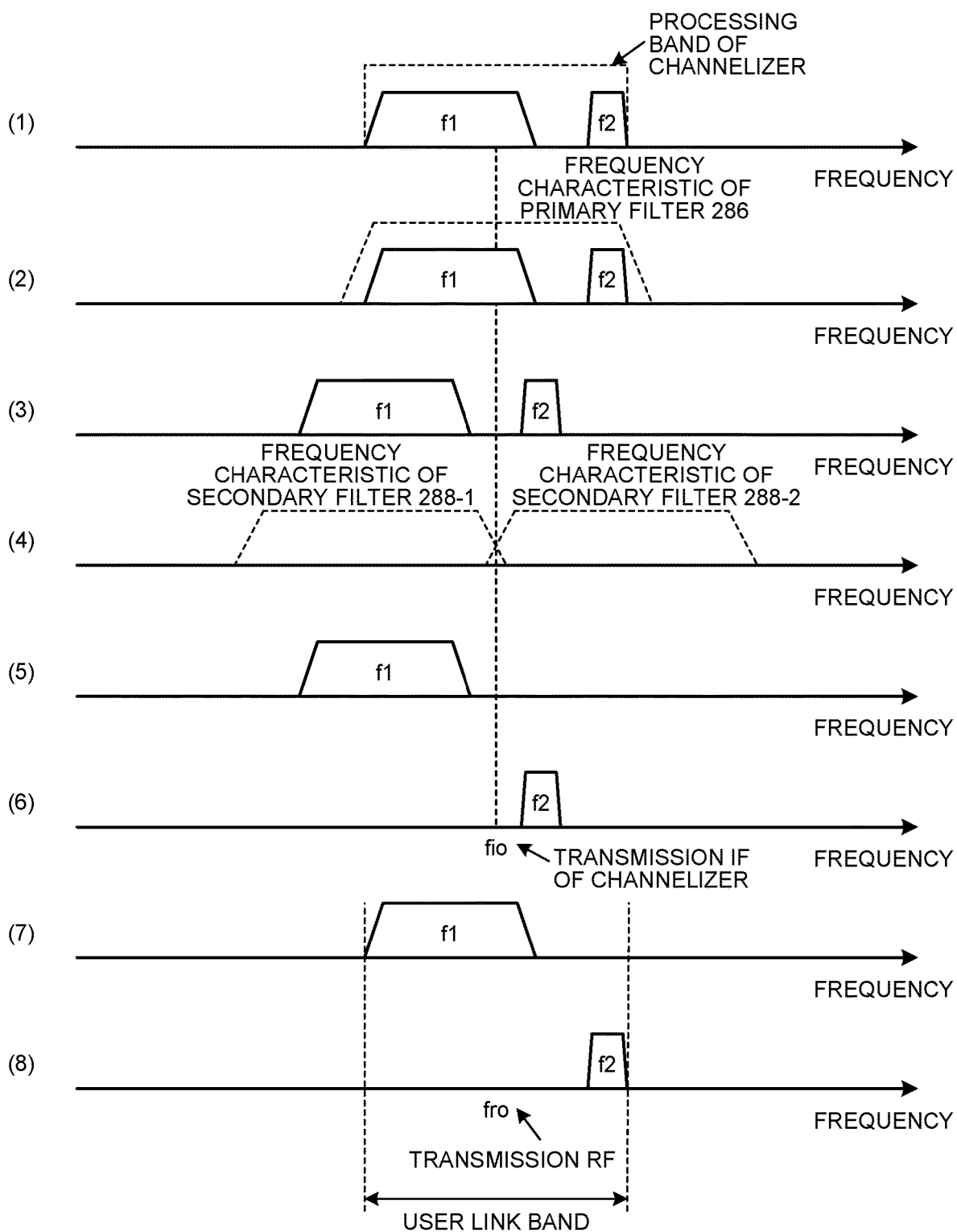
FIG. 21 is a diagram illustrating an operation example when the satellite repeater according to the third embodiment relays a signal transmitted from a gateway to a terminal.

FIG. 21 is a diagram illustrating an operation example when the satellite repeater 2b according to the present embodiment relays a signal transmitted from the gateway 4, to the terminal 10. The operation of the user link transmission RF unit 28b of the present embodiment will be described with reference to FIGS. 19 and 21.

The operation until the signal transmitted from the gateway 4 is received by the satellite repeater 2b and input to the channelizer 23 is similar to the operation in the first embodiment. In FIG. 21, (1) illustrates a signal output from the channelizer 23 to the user link transmission RF unit 28b. The primary filter 286 has a frequency characteristic, as illustrated in (2) of FIG. 21, for performing filtering on the signal input from the channelizer 23. The frequency characteristic of the primary filter 286 is a frequency characteristic for extracting a signal in the processing band of the channelizer and removing a signal in other frequency zones. That is, the primary filter 286, which is a primary transmitting filter, receives, from the channelizer 23, a signal including signal components transmitted with two beams belonging to the same cluster, and performs the filtering on the signal received from the channelizer 23.

The primary filter 286 passes the filtered signal to the primary frequency conversion unit 287. In FIG. 20, (3) illustrates a signal having the frequency converted by the primary frequency conversion unit 287. The primary frequency conversion unit 287 converts the frequency by an amount equivalent to a difference between the transmission IF fio and the frequency at the borderline between the frequency zones allocated to the signals corresponding to the two beams input from the channelizer 23. The transmission IF fio is the center frequency of the processing band of the channelizer. This conversion causes the frequency at the borderline between the frequency zones to match the transmission IF fio. That is, the primary frequency conversion unit 287, which is a primary transmission frequency conversion unit, converts the frequency of the filtered signal provided by the primary filter 286, into a third frequency zone.

The primary frequency conversion unit 287 passes the frequency-converted signal to the distributing unit 282b. The distributing unit 282b duplicates the signal having the frequency converted by the primary frequency conversion unit 287, and outputs the duplicated signals to the secondary filters 288-1 and 288-2. That is, the distributing unit 282b distributes the signal having the frequency converted by the primary frequency conversion unit 287, to two signals. In FIG. 21, (4) illustrates the frequency characteristics of the secondary filters 288-1 and 288-2. As illustrated in (4) of FIG. 21, the frequency characteristics of the secondary filters 288-1 and 288-2 are frequency characteristics that split up, at the transmission IF fio, the frequency zone to be extracted. In FIG. 21, (5) and (6) illustrate filtered signals provided by the secondary filters 288-1 and 288-2, respectively. That is, the secondary filters 288-1 and 288-2, which define a secondary transmitting filter unit, have different frequency characteristics for performing filtering on the two signals distributed by the distributing unit 282b. The secondary filters 288-1 and 288-2 pass the filtered signals to the secondary frequency conversion units 289-1 and 289-2, respectively.

In FIG. 21, (7) and (8) illustrate signals having the frequencies converted by the secondary frequency conversion units 289-1 and 289-2, respectively. As illustrated in (7) and (8) of FIG. 21, the secondary frequency conversion units 289-1 and 289-2 perform frequency conversion such that both of the signals received from the secondary filters 288-1 and 288-2 fall within the user link band without overlapping. The secondary frequency conversion units 289-1 and 289-2 pass the frequency-converted signals to the transmitting antennas 284-1 and 284-2, respectively. That is, the secondary frequency conversion units 289-1 and 289-2, which define a secondary transmission frequency conversion unit, convert the frequencies of the filtered two respective signals provided by the secondary filters 288-1 and 288-2, into a fourth frequency zone.

As described thus far, in the present embodiment, it is possible to use the channelizer 23 capable of responding to a change in communication demand and reduce the number of input/output ports of the channelizer 23. Accordingly, the number of parts can be reduced as compared with a configuration in which the received signal is input to the channelizer on the beam-by-beam basis. Furthermore, the processing band of the channelizer can be reduced as compared with the second embodiment, while the maximum value of the bandwidth allocatable to each beam can be expanded as compared with the first embodiment.

Note that, as described in the second embodiment, when a signal received from the terminal 10 is relayed, the frequency conversion may be performed in a larger number of stages to provide the reception IF. In addition, when a signal received from the gateway 4 is relayed, the frequency conversion may be performed in a larger number of stages to provide the transmission RF.

Although the above description gives an example in which one cluster is made up of two beams and the relay processing is performed on the cluster-by-cluster basis, the number of beams defining the cluster may be three or more as in the first embodiment.

Fourth Embodiment

Figure 22:
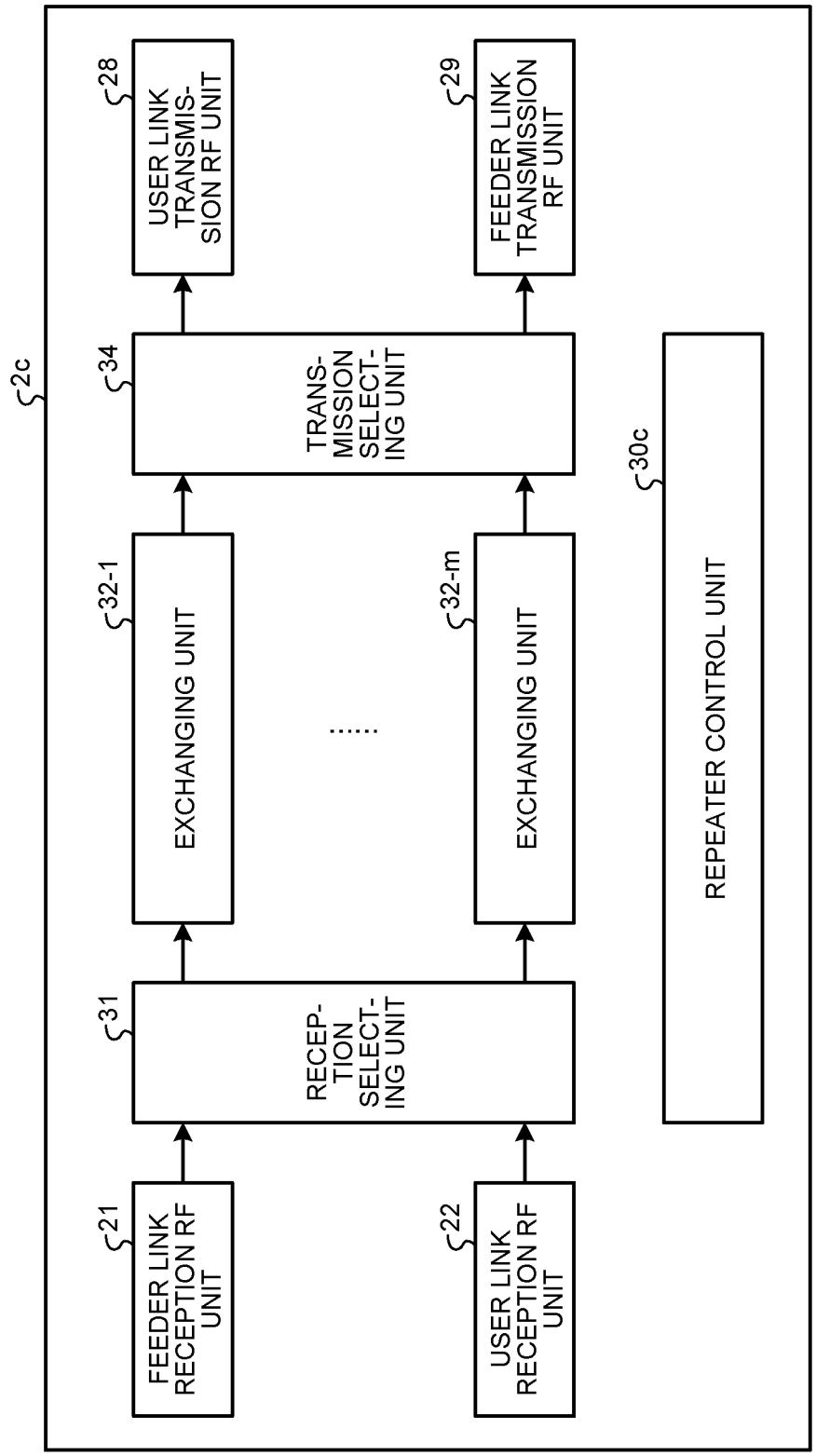
FIG. 22 is a diagram illustrating a configuration example of a satellite repeater according to a fourth embodiment.

FIG. 22 is a diagram illustrating a configuration example of a satellite repeater 2c according to a fourth embodiment of the present invention. The configuration of the satellite communication system of the present embodiment is similar to the configuration of the first embodiment except that the satellite repeater 2c is provided instead of the satellite repeater 2 of the first embodiment. However, the band allocation operation in the communication network control station 5 is partially different from the band allocation operation in the first embodiment. Elements having functions similar to those in the first embodiment are denoted by the same reference numerals as those in the first embodiment and redundant explanations will be omitted. Hereinafter, differences from the first embodiment will be mainly described.

As illustrated in FIG. 22, the satellite repeater 2c includes the feeder link reception RF unit 21, the user link reception RF unit 22, a reception selecting unit 31, exchanging units 32-1 to 32-m (m is an integer equal to or greater than two), a transmission selecting unit 34, the user link transmission RF unit 28, the feeder link transmission RF unit 29, and a repeater control unit 30c.

The satellite repeater 2c of the present embodiment includes the reception selecting unit 31, the exchanging units 32-1 to 32-m, and the transmission selecting unit 34 instead of the channelizer 23 of the first embodiment. The exchanging units 32-1 to 32-m are examples of a plurality of exchanging units that performs the exchanging processing on input reception signals and outputs the reception signals having undergone the exchanging processing, as transmission signals. The exchanging units 32-1 to 32-m have a function capable of changing either one or both of the frequency and the path to the destination of transmission/reception. The exchanging units 32-1 to 32-m can be, for example, a digital channelizer provided by digital devices typically including an analog-to-digital (A/D) converter, an FPGA, and a digital-to-analog (D/A) converter. Alternatively, the exchanging units 32-1 to 32-m can be an analog channelizer provided by analog devices typically including a frequency converter, a filter, a distributor, a combiner, and a switch circuit. Alternatively, the exchanging units 32-1 to 32-m can be a vent pipe provided by a fixed frequency converter and a filter.

At least some of the exchanging units 32-1 to 32-m have specifications different from each other such as exchange performance and functions. For example, at least some of the exchanging units 32-1 to 32-m are different from each other in at least one of the overall relayable bandwidth, the granularity of the minimum frequency to be exchanged, the guard band at the time of filtering, and the out-of-band attenuation amount. In general, the exchanging unit having higher exchange performance consumes higher power and the exchanging unit with a higher function has higher power consumption. Meanwhile, as described in the first to third embodiments, when the channelizer 23 is used, the channelizer 23 is required to have exchange performance and functions that can accommodate the presumed maximum band. The satellite repeater 2c of the present embodiment includes a plurality of exchanging units with different specifications, that is, of different classes, and selectively uses the exchanging units determined according to the required bands of individual clusters, such that the power consumption can be suppressed as compared with the first to third embodiments.

Figure 23:
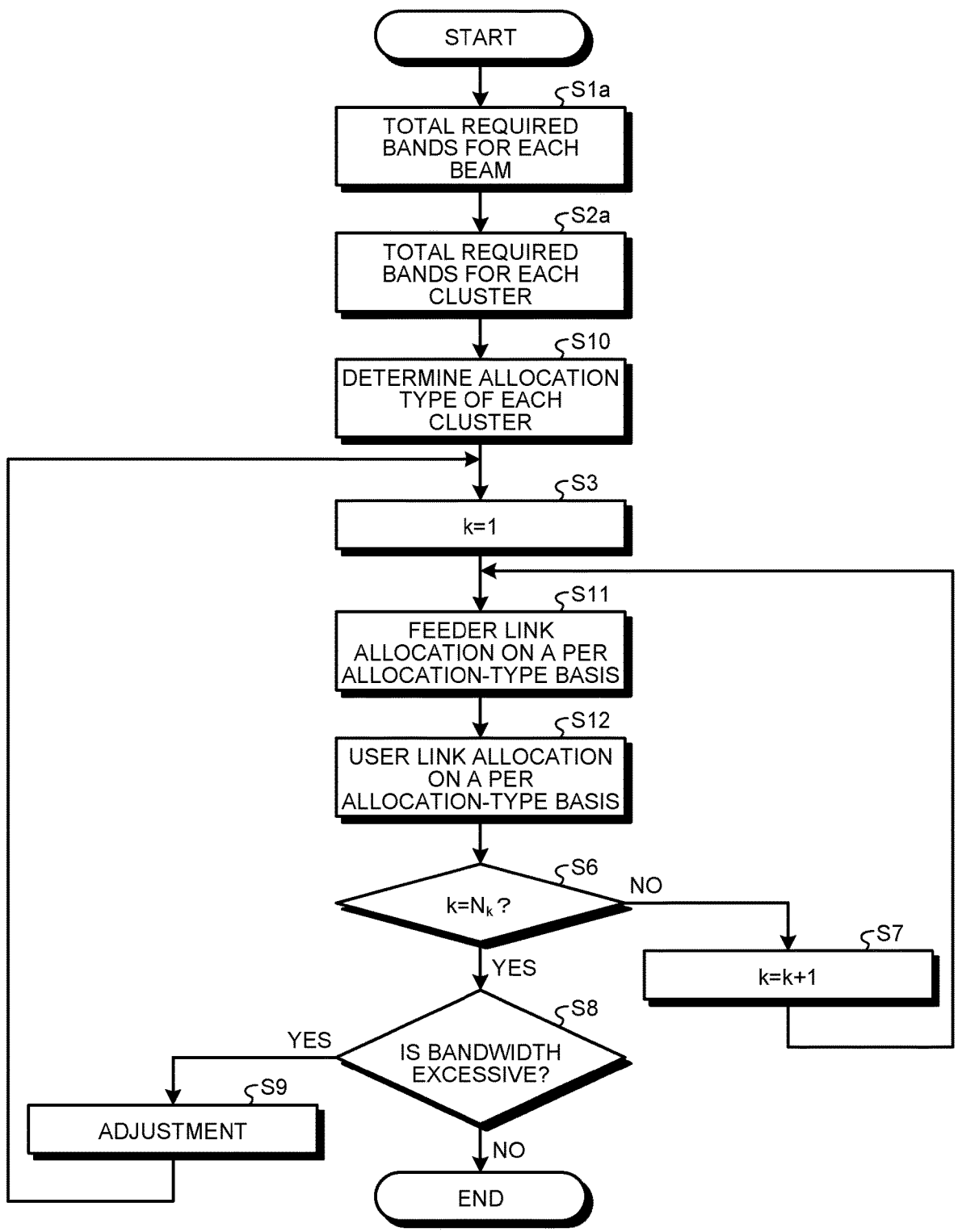
FIG. 23 is a flowchart illustrating an example of the operation of the resource control unit of the communication network control station according to the fourth embodiment.

FIG. 23 is a flowchart illustrating an example of the operation of the resource control unit 55 of the communication network control station 5 according to the present embodiment. In step S1a, the resource control unit 55 totals the required bands for individual beams as in the first embodiment. More specifically, in step S1a, the resource control unit 55 totals the required bands in a star configuration and the required bands in a mesh configuration separately. In the star configuration, the terminal 10 communicates with the gateway 4. In the mesh configuration, the terminal 10 communicates with another terminal 10 not via the gateway 4. In step S2a, the resource control unit 55 totals the required bands for each cluster as in the first embodiment. However, in step S2a, the resource control unit 55 totals the required bands for each cluster in the star configuration and the required bands for each cluster in the mesh configuration separately.

After step S2a, the resource control unit 55 determines the allocation type for each cluster on the basis of the required band for each cluster (step S10). Here, the allocation type refers to the class of the exchanging unit used when the satellite repeater 2c exchanges the signal corresponding to each cluster. That is, in step S10, the resource control unit 55 selects an exchanging unit to be used in the satellite repeater 2c, on the cluster-by-cluster basis.

After step S10, as in the first embodiment, step S3 is carried out. Next, the resource control unit 55 allocates the band of the feeder link to each beam on a per allocation-type basis (step S11). The resource control unit 55 also allocates the band of the user link to each beam on the per allocation-type basis (step S12). Steps S6 to S9 are similar to those in the first embodiment. As in the first embodiment, the communication network control station 5 determines the frequency conversion amounts of the frequency conversion unit 224 and the frequency conversion unit 281 of the satellite repeater 2 and the routing table used by the switch unit 25, and directly or indirectly transmits these determined items to the satellite repeater 2c. At this time, the communication network control station 5 also transmits the above-described allocation type, that is, information as to which exchanging unit is to be used, to the satellite repeater 2c. In the satellite repeater 2c, the repeater control unit 30c controls the reception selecting unit 31 and the transmission selecting unit 34 on the basis of the information as to which exchanging unit is to be used. On the basis of an instruction from the repeater control unit 30c, the reception selecting unit 31 selects an exchanging unit to which the signal received from the user link reception RF unit 22 is to be output, on the cluster-by-cluster basis. In addition, on the basis of an instruction from the repeater control unit 30c, the transmission selecting unit 34 selects an exchanging unit from which a signal is to be received, on the cluster-by-cluster basis.

The allocation operation in the resource control unit 55 according to the present embodiment will be described giving a specific example. In this example, the satellite repeater 2c includes three exchanging units 32-1 to 32-3 and these exchanging units 32-1 to 32-3 are of different classes. Assume that the exchanging unit 32-1 is a digital channelizer with a maximum processing band of 250 MHz per cluster, the exchanging unit 32-2 is an analog channelizer with a maximum processing band of 500 MHz per cluster, and the exchanging unit 32-3 is a vent pipe with a processing band of 125 MHz per beam. Allocation types corresponding to the exchanging units 32-1, 32-2, and 32-3 are referred to as type A, type B, and type C, respectively. Among the three exchanging units, the exchanging unit 32-3 has the lowest capability and the lowest power consumption.

As described above, the resource control unit 55 has obtained the total required band of each cluster with respect to each of the star configuration and the mesh configuration. First, the resource control unit 55 allocates, to the required band in the mesh configuration, type A corresponding to the digital channelizer having the highest degree of freedom of routing. The resource control unit 55 allocates type C corresponding to the vent pipe with a processing band of 125 MHz per beam, to a beam having a required band equal to or less than 125 MHz in the star configuration. Furthermore, the resource control unit 55 allocates type B corresponding to the analog channelizer with a maximum processing band of 500 MHz per cluster, to a beam having a required band over 125 MHz in the star configuration.

FIG. 24 is a diagram illustrating an example of the required bands and the allocation types in the fourth embodiment. In the example illustrated in FIG. 24, twelve beams with beam numbers 1 to 12 are classified so as to belong to the same cluster two by two in ascending order of the beam number. For example, a beam with beam number 1 and a beam with beam number 2 belong to a cluster with cluster number 1, and a beam with beam number 3 and a beam with beam number 4 belong to a cluster with cluster number 2. In FIG. 24, a column denoted as the required band (star configuration) indicates the required bands in the star configuration by beam, and a column denoted as the required band (mesh configuration) indicates the required bands in the mesh configuration by beam. In FIG. 24, a column denoted as the total required band (star configuration) indicates the required bands in the star configuration by cluster, and a column denoted as the total required band (mesh configuration) indicates the required bands in the mesh configuration by cluster. In FIG. 24, the allocation type indicates the results of allocation by the resource control unit 55.

In the example illustrated in FIG. 24, since the beam with beam number 1 is used only for the transfer in the star configuration and the required band in the star configuration is 500 MHz, the resource control unit 55 allocates type B to the beam with beam number 1. Since the beam with beam number 2 is used only for the transfer in the mesh configuration, the resource control unit 55 allocates type A to the beam with beam number 2. For the beam with beam number 3, the required band in the mesh configuration is not zero and the required band in the star configuration is 100 MHz. The beam with beam number 3 is thus allocated type A and type C temporarily. For the beam with beam number 4, the required band in the mesh configuration is zero and the required band in the star configuration is 400 MHz. The beam with beam number 4 is thus allocated type B.

The beam with beam number 4, which belongs to the same cluster as the beam with beam number 3, is allocated type B. For this cluster, the total required band in the star configuration is 500 MHz, which total required band remains within the throughput range of the exchanging unit 32-2. In this case, the resource control unit 55 judges that not the allocation type for each of the beams with beam numbers 3 and 4, but the allocation type for the cluster should be determined. For this cluster with cluster number 2, then, type B is allocated to the required band in the star configuration. In the present embodiment, as described above, whether the allocation type is determined on the cluster-by-cluster basis or the allocation type is determined on the beam-by-beam basis is judged depending on the required band in the star configuration. For example, when the cluster contains a beam for which a required band in the star configuration exceeds the throughput range of the exchanging unit 32-3, the resource control unit 55 allocates type B to the cluster on condition that the total required band in the star configuration for the cluster remains within the throughput range of the exchanging unit 32-2. In addition, also in a case where the total required band in the star configuration for the cluster remains within the throughput range of the exchanging unit 32-3, type C can be allocated to the cluster.

The resource control unit 55 allocates a band to the user link in units of clusters on the basis of the allocation type determined on the beam-by-beam basis or on the cluster-by-cluster basis. In detail, when there is no allocation type common to the beams in the cluster, that is, when the allocation type is determined on the beam-by-beam basis, the resource control unit 55 allocates different frequency zones to the individual beams defining the cluster. In this case, the frequency zones of the individual beams may be adjacent to each other or may not be adjacent to each other. On the other hand, when there is an allocation type common to beams in the cluster, that is, when the allocation type is determined on the cluster-by-cluster basis, a band is allocated for the required band for which the allocation type is determined on the cluster-by-cluster basis such that the frequency zones to be allocated to two beams are adjacent to each other. This is because, as described in the first to third embodiments, the signals of two beams are multiplexed and output from the user link reception RF unit 22 to the exchanging unit, and the output multiplexed signal should match the processing band of the exchanging unit.

Figure 25:
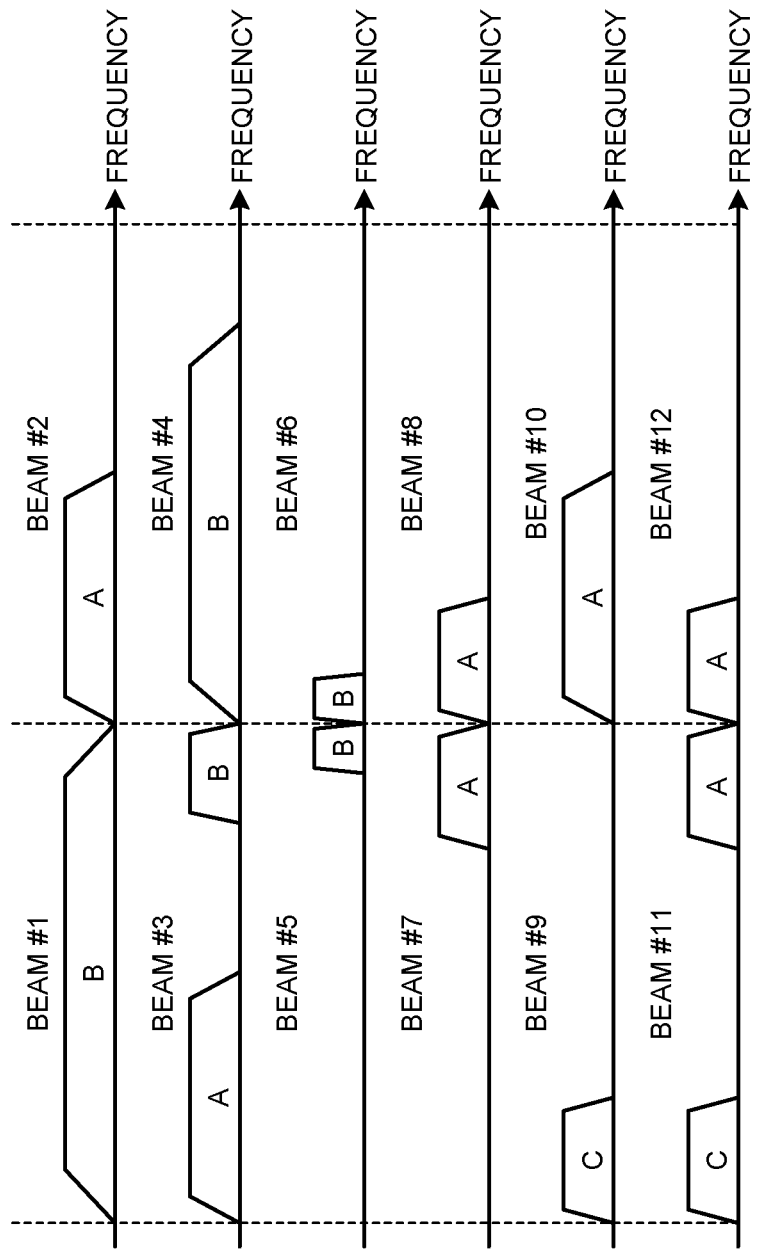
FIG. 25 is a diagram illustrating a result of frequency band allocation premised on the required bands illustrated in FIG. 24.

FIG. 25 is a diagram illustrating a result of frequency band allocation premised on the required bands illustrated in FIG. 24. FIG. 25 illustrates the frequency band allocated to each cluster by the resource control unit 55, which allocation is premised on the required bands illustrated in FIG. 24. A beam #p (p is an integer equal to or greater than one) indicates a beam with beam number p. In FIG. 25, the diagram at the first row illustrates the allocation result of the frequency band for the cluster with cluster number 1. The diagram at the second row illustrates the allocation result of the frequency band for the cluster with cluster number 2. The diagram at the third row illustrates the allocation result of the frequency band for the cluster with cluster number 3. In FIG. 25, the diagram at the fourth row illustrates the allocation result of the frequency band for the cluster with cluster number 4. The diagram at the fifth row illustrates the allocation result of the frequency band for the cluster with cluster number 5. The diagram at the sixth row illustrates the allocation result of the frequency band for the cluster with cluster number 6.

In FIG. 25, a capital alphabet appearing in each frequency band corresponds to type A, type B, or type C. For the cluster with cluster number 2 made up of beam numbers 3 and 4, as illustrated in the second row of FIG. 25, for example, a frequency band denoted as A is allocated to the required band in the mesh configuration for the beam with beam number 3 to which type A is allocated. In addition, type B is allocated to the required band in the star configuration for the cluster with cluster number 2. For this reason, adjacent frequency zones denoted as B are allocated to the beam with beam number 3 and the beam with beam number 4 as the required band in the star configuration.

The above description gives an example in which the user link reception RF unit 22 and the user link transmission RF unit 28 in the first embodiment are used. Alternatively, instead of these units, the user link reception RF unit 22a and the user link transmission RF unit 28a in the second embodiment, or the user link reception RF unit 22b and the user link transmission RF unit 28b in the third embodiment may be used.

As described above, the resource control unit 55 can selectively use the exchanging unit 32-2, which is an analog channelizer, and the exchanging unit 32-3, which is a vent pipe, in transmission in the required band in the star configuration for each beam and each cluster. In the present embodiment, thus, frequencies can be allocated efficiently according to the required band for each cluster and the class of each exchanging unit, whereby unnecessary consumption of power can be prevented and the frequency utilization efficiency can be improved.

As described thus far, in the present embodiment, the satellite repeater 2c includes a plurality of exchanging units of different classes, and the communication network control station 5 determines the exchanging unit to be used for relaying on the beam-by-beam basis or the cluster-by-cluster basis, and allocates the frequency on the cluster-by-cluster basis. Accordingly, it becomes possible to flexibly allocate the frequency as compared with the first embodiment, as well as to achieving effects similar to those of the first embodiment. In addition, even when the combination of the exchanging units mounted on the repeater is changed, communication can be provided to each beam with a desired bandwidth. For example, a bandwidth allocated when all exchanging units are the digital channelizer and a bandwidth allocated when some of the exchanging units are the analog channelizer or the like can be made coincident with each other depending on traffic conditions of each beam. That is, even when exchanging units having a plurality of specifications are mixed at the time of designing, communication performance equal to that obtained when the repeater is designed to have a full flexible configuration can be implemented by controlling the allocation technique of the present embodiment.

In some cases, the satellite repeater is required to have functions of providing connections between beams and frequency flexibility. Furthermore, the above-mentioned flexibility is various including the flexibility expected for all beams and the flexibility expected for some beams. When the maximum flexibility is required for all beams, the digital channelizer is necessary. Meanwhile, when the flexibility is required only for some beams, there are cases where, instead of configuring all beams with the digital channelizer, the digital channelizers are mixed with analog channelizers, vent pipes, and the like having lower flexibility but having advantages in weight, power consumption, cost, and the like. In such a case, applying the operation of the present embodiment makes it possible to efficiently allocate frequencies in accordance with the required band for each cluster and the class of each exchanging unit.

The configurations illustrated in the above embodiments indicate examples of the content of the present invention and can be combined with another known technology. A part of the configuration can also be omitted and modified without departing from the gist of the present invention.

REFERENCE SIGNS LIST 1-1 to 1-n, 3-1 to 3-n beam; 2, 2a, 2b, 2c satellite repeater; 4-1 to 4-j gateway; 5 communication network control station; 6 public network; 10 terminal; feeder link reception RF unit; 22, 22a, 22b user link reception RF unit; 23 channelizer; 24 demultiplexing unit; 25 switch unit; 26 multiplexing unit; 27 channelizer control unit; 28, 28a, 28b user link transmission RF unit; 29 feeder link transmission RF unit; 30, 30c repeater control unit; 51 transmission/reception unit; 52 control information accumulating unit; 53 traffic monitoring unit; 54 line quality monitoring unit; resource control unit; 200 satellite communication system; 221-1, 221-2 receiving antenna; 222-1, 222-2, 222a-1, 222a-2, 283-1, 283-2, 283a-1, 283a-2 filter; 223, 223a, 223b combining unit; 224, 281, 225-1, 225-2, 285-1, 285-2 frequency conversion unit; 226-1, 226-2, 287 primary frequency conversion unit; 227-1, 227-2, 286 primary filter; 228, 289-1, 289-2 secondary frequency conversion unit; 229, 288-1, 288-2 secondary filter; 282, 282a, 282b distributing unit; 284-1, 284-2 transmitting antenna.

The invention claimed is:

1. A communication system comprising a control station and a repeater capable of forming two or more beams, wherein the control station includes a controller to classify the two or more beams into clusters each made up of two or more beams among the two or more beams and allocate different frequencies to the beams belonging to one of the clusters, the repeater includes an exchanger to perform exchanging processing on an input reception signal and output the reception signal having undergone the exchanging processing, as a transmission signal, and a signal used in the exchanging processing includes a signal obtained by combining signals corresponding to the beams defining the one cluster wherein the repeater includes at least one of a reception processor and a transmission processor, wherein the reception processor includes:

a receiving filter having different frequency characteristics to perform filtering on signals received with the two or more beams belonging to the same one cluster;

a combiner to combine the signals processed by the receiving filter, to generate one combined signal; and a reception frequency converter to convert a frequency of the combined signal and output the signal having the frequency converted, to the exchanger; and wherein the transmission processor includes:

a transmission frequency converter to receive, from the exchanger, a signal including signal components transmitted with the two or more beams belonging to the same one cluster and convert a frequency of the signal received from the exchanger;

a distributer to distribute the signal having the frequency converted by the transmission frequency converter, to two or more signals; and a transmitting filter having different frequency characteristics to perform filtering on the two or more individual distributed signals.

2. A communication system comprising a control station and a repeater capable of forming two or more beams, wherein the control station includes a controller to classify the two or more beams into clusters each made up of two or more beams among the two or more beams and allocate different frequencies to the beams belonging to one of the clusters, the repeater includes an exchanger to perform exchanging processing on an input reception signal and output the reception signal having undergone the exchanging processing, as a transmission signal, and a signal used in the exchanging processing includes a signal obtained by combining signals corresponding to the beams defining the one cluster wherein the repeater includes at least one of a reception processor and a transmission processor, wherein the reception processor includes:

a reception frequency converter to convert frequencies of respective signals received by the two or more beams belonging to the same one cluster;

a receiving filter having different frequency characteristics to perform filtering on two or more signals having the frequencies converted by the reception frequency converter; and a combiner to combine the signals processed by the receiving filter and output the combined signal to the exchanger, as one combined signal, and wherein the transmission processor includes:

a distributer to receive, from the exchanger, a signal including signal components transmitted with the two or more beams belonging to the same one cluster and distribute the signal received from the exchanger, to two or more signals;

a transmitting filter having different frequency characteristics to perform filtering on the two or more signals distributed by the distributer; and a transmission frequency converter to convert frequencies of the two or more individual filtered signals provided by the transmitting filter.

3. A communication system comprising a control station and a repeater capable of forming two or more beams, wherein the control station includes a controller to classify the two or more beams into clusters each made up of two or more beams among the two or more beams and allocate different frequencies to the beams belonging to one of the clusters, the repeater includes an exchanger to perform exchanging processing on an input reception signal and output the reception signal having undergone the exchanging processing, as a transmission signal, and a signal used in the exchanging processing includes a signal obtained by combining signals corresponding to the beams defining the one cluster wherein the repeater includes at least one of a reception processor and a transmission processing unit processor, and wherein the reception processor includes:

a primary reception frequency converter to convert frequencies of individual signals received with the two or more beams belonging to the same cluster, into a first frequency zone;

a primary receiving filter having different frequency characteristics to perform filtering on two or more individual signals having the frequencies converted by the primary reception frequency converter;

a combiner to combine the signals processed by the primary receiving filter, to generate one combined signal;

a secondary reception frequency converter to convert a frequency of the combined signal provided by the combiner, into a second frequency zone; and a secondary receiving filter to perform filtering on the signal having the frequency converted by the secondary reception frequency converter and output the filtered signal to the exchanger; and wherein the transmission processor includes:

a primary transmitting filter to receive, from the exchanger, a signal including signal components transmitted with the two or more beams belonging to the same one cluster and perform filtering on the signal received from the exchanger;

a primary transmission frequency converter to convert a frequency of the filtered signal provided by the primary transmitting filter, into a third frequency zone;

a distributer to distribute the signal having the frequency converted by the primary transmission frequency converter, to two or more signals;

a secondary transmitting filter having different frequency characteristics to perform filtering on the two or more individual signals distributed by the distributer; and a secondary transmission frequency converter to convert frequencies of the two or more individual filtered signals provided by the secondary transmitting filter, into a fourth frequency zone.

4. A communication system comprising a control station and a repeater capable of forming two or more beams, wherein the control station includes a controller to classify the two or more beams into clusters each made up of two or more beams among the two or more beams and allocate different frequencies to the beams belonging to one of the clusters, the repeater includes an exchanger to perform exchanging processing on an input reception signal and output the reception signal having undergone the exchanging processing, as a transmission signal, and a signal used in the exchanging processing includes a signal obtained by combining signals corresponding to the beams defining the one cluster wherein the repeater includes a plurality of the exchangers, and the exchanging processing is carried out on a cluster-by-cluster basis, using one of the exchangers determined by the control station on the basis of a required band of communication relayed by the repeater.

5. A repeater comprising:

an antenna capable of forming two or more beams; and an exchanger to perform exchanging processing on an input reception signal and output the reception signal having undergone the exchanging processing, as a transmission signal, wherein the two or more beams are classified into clusters each made up of two or more beams among the two or more beams and different frequencies are allocated to the beams belonging to one of the clusters, and a signal used in the exchanging processing includes a signal obtained by combining signals corresponding to the beams defining the one cluster, wherein the repeater further comprises at least one of a reception processor and a transmission processor, wherein the reception processor includes:

a receiving filter having different frequency characteristics to perform filtering on signals received with the two or more beams belonging to the same one cluster;

a combiner to combine the signals processed by the receiving filter, to generate one combined signal; and a reception frequency converter to convert a frequency of the combined signal and output the signal having the frequency converted, to the exchanger; and wherein the transmission processor includes:

a transmission frequency converter to receive, from the exchanger, a signal including signal components transmitted with the two or more beams belonging to the same cluster and convert a frequency of the signal received from the exchanger;

a distributer to distribute the signal having the frequency converted by the transmission frequency converter, to two or more signals; and a transmitting filter having different frequency characteristics to perform filtering on the two or more distributed signals.

6. A control station comprising a controller to classify two or more beams that the repeater according to claim 5 is capable of forming, into clusters each made up of two or more beams among the two or more beams, and allocate different frequencies to the beams belonging to one of the clusters.

7. A repeater comprising:

an antenna capable of forming two or more beams; and an exchanger to perform exchanging processing on an input reception signal and output the reception signal having undergone the exchanging processing, as a transmission signal, wherein the two or more beams are classified into clusters each made up of two or more beams among the two or more beams and different frequencies are allocated to the beams belonging to one of the clusters, and a signal used in the exchanging processing includes a signal obtained by combining signals corresponding to the beams defining the one cluster, wherein the repeater further comprises at least one of a reception processing unit processor and a transmission processor, wherein the reception processor includes:

a reception frequency converter to convert frequencies of individual signals received with the two or more beams belonging to the same one cluster;

a receiving filter having different frequency characteristics to perform filtering on two or more signals having the frequencies converted by the reception frequency converter; and a combiner to combine the signals processed by the receiving filter and output the combined signal to the exchanger, as one combined signal; and the transmission processor includes:

a distributer to receive, from the exchanger, a signal including signal components transmitted with the two or more beams belonging to the same cluster and distribute the signal received from the exchanger, to two or more signals;

a transmitting filter having different frequency characteristics different to perform filtering on the two or more signals distributed by the distributer; and a transmission frequency converter to convert frequencies of the two or more individual filtered signals provided by the transmitting filter.

8. A control station comprising a controller to classify two or more beams that the repeater according to claim 6 is capable of forming, into clusters each made up of two or more beams among the two or more beams, and allocate different frequencies to the beams belonging to one of the clusters.

9. A repeater comprising:

an antenna capable of forming two or more beams; and an exchanger to perform exchanging processing on an input reception signal and output the reception signal having undergone the exchanging processing, as a transmission signal, wherein the two or more beams are classified into clusters each made up of two or more beams among the two or more beams and different frequencies are allocated to the beams belonging to one of the clusters, and a signal used in the exchanging processing includes a signal obtained by combining signals corresponding to the beams defining the one cluster wherein the repeater further comprises at least one of a reception processing unit processor and a transmission processor, wherein the reception processor includes:

a primary reception frequency converter to convert frequencies of individual signals received with the two or more beams belonging to the same cluster, into a first frequency zone;

a primary receiving filter having different frequency characteristics to perform filtering on two or more signals having the frequencies converted by the primary reception frequency converter;

a combiner to combine the signals processed by the primary receiving filter, to provide one combined signal;

a secondary reception frequency converter to convert a frequency of the combined signal provided by the combiner, into a second frequency zone; and a secondary receiving filter to perform filtering on the signal having the frequency converted by the secondary reception frequency converter and output the filtered signal to the exchanger; and wherein the transmission processor includes:

a primary transmitting filter to receive, from the exchanger, a signal including signal components transmitted with the two or more beams belonging to the same cluster and perform filtering on the signal received from the exchanger;

a primary transmission frequency converter to convert a frequency of the filtered signal provided by the primary transmitting filter, into a third frequency zone;

a distributer to distribute the signal having the frequency converted by the primary transmission frequency converter, to two or more signals;

a secondary transmitting filter having different frequency characteristics different to perform filtering on the two or more signals distributed by the distributer; and a secondary transmission frequency converter to convert frequencies of the two or more individual filtered signals provided by the secondary transmitting filter, into a fourth frequency zone.

10. A control station comprising a controller to classify two or more beams of a repeater into clusters each made up of two or more beams among the two or more beams of the repeater, the repeater including: an antenna capable of forming the two or more beams; and a plurality of exchangers to each perform exchanging processing on an input reception signal and output the reception signal having undergone the exchanging processing, as a transmission signal, the controller selecting, on a cluster-by-cluster basis, one of the exchangers to be used in the repeater, and allocating different frequencies to the beams belonging to one of the clusters, wherein a signal used in the exchanging processing includes a signal obtained by combining signals corresponding to the beams defining the one cluster.

11. A control method for a control station to control a repeater including: an antenna capable of forming two or more beams; and a plurality of exchangers to each perform exchanging processing on an input reception signal and output the reception signal having undergone the exchanging processing, as a transmission signal, the control method comprising:

classifying the two or more beams into clusters each made up of two or more beams among the two or more beams and selecting one of the exchangers to be used in the repeater, on a cluster-by-cluster basis; and allocating different frequencies to the beams belonging to one of the clusters, wherein a signal used in the exchanging processing includes a signal obtained by combining signals corresponding to the beams defining the one cluster.

* * * * *